United States Patent
Broach et al.

(10) Patent No.: US 12,233,592 B2
(45) Date of Patent: Feb. 25, 2025

(54) SOLID-STATE ADDITIVE MANUFACTURING METHODS FOR COMPOUNDING CONDUCTIVE POLYMER COMPOSITIONS

(71) Applicant: MELD MANUFACTURING CORPORATION, Christiansburg, VA (US)

(72) Inventors: Anita T Broach, Christiansburg, VA (US); Chase Cox, Radford, VA (US); Nanci Hardwick, Blacksburg, VA (US)

(73) Assignee: MELD MANUFACTURING CORPORATION, Christiansburg, VA (US)

( * ) Notice: Subject to any disclaimer, the term of this patent is extended or adjusted under 35 U.S.C. 154(b) by 542 days.

(21) Appl. No.: 17/197,771

(22) Filed: Mar. 10, 2021

(65) Prior Publication Data

US 2021/0308937 A1    Oct. 7, 2021

Related U.S. Application Data

(63) Continuation of application No. PCT/US2019/050595, filed on Sep. 11, 2019.
(Continued)

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/245* (2017.08);
(Continued)

(58) Field of Classification Search
CPC ... B29C 64/106; B29C 64/209; B29C 64/245; B29C 64/314; B33Y 10/00; B33Y 70/00;
(Continued)

(56) References Cited

U.S. PATENT DOCUMENTS

2012/0040581 A1   2/2012   Kim
2012/0279441 A1   11/2012  Creehan
(Continued)

FOREIGN PATENT DOCUMENTS

RU   2620435 C1   5/2017

OTHER PUBLICATIONS

Search Report for PCT/US2019/05095 transmitted on Jan. 27, 2020.
"Why is carbon black conductive and Activated Carbon is not Conductive?" Apr. 4, 2016, retrieved on Jan. 4, 2020.

*Primary Examiner* — Michael M. Robinson
(74) *Attorney, Agent, or Firm* — Rhodes IP PLC; Christopher R Rhodes

(57) ABSTRACT

Solid-state additive manufacturing methods for compounding conductive plastic compositions, fabrication of conductive plastic parts and conductive coatings, and plastic recycling are disclosed. Electrically conductive or thermally conductive plastic compositions are compounded and subsequently printed with the solid-state additive manufacturing system. The solid-state fabricated compositions, parts and coatings can also be manufactured to be both thermally and electrically conductive. Solid-state plastic waste recycling methods are also disclosed where various plastic waste materials and shapes are solid-state processed. The plastic waste can be mixed with virgin plastic material or mixed with other types of materials such as metals, ceramics or their combination. The waste plastic feedstock is reinforced with different types of reinforcing particles or fibers, or various additives are added for improving properties of the final deposits.

20 Claims, 17 Drawing Sheets

Related U.S. Application Data

(60) Provisional application No. 62/740,758, filed on Oct. 3, 2018, provisional application No. 62/729,836, filed on Sep. 11, 2018.

(51) Int. Cl.
*B29C 64/245* (2017.01)
*B29C 64/314* (2017.01)
*B29C 64/329* (2017.01)
*B29K 105/16* (2006.01)
*B29K 105/26* (2006.01)
*B29K 507/04* (2006.01)
*B33Y 10/00* (2015.01)
*B33Y 40/10* (2020.01)
*B33Y 70/00* (2020.01)

(52) U.S. Cl.
CPC .......... *B29C 64/314* (2017.08); *B29C 64/329* (2017.08); *B33Y 10/00* (2014.12); *B33Y 40/10* (2020.01); *B33Y 70/00* (2014.12); *B29K 2105/167* (2013.01); *B29K 2105/26* (2013.01); *B29K 2507/04* (2013.01); *B29K 2995/0005* (2013.01); *B29K 2995/0011* (2013.01); *B29K 2995/0013* (2013.01)

(58) Field of Classification Search
CPC ............ B29K 2105/26; B29K 2507/04; B29K 2995/0005
See application file for complete search history.

(56) References Cited

U.S. PATENT DOCUMENTS

| | | |
|---|---|---|
| 2015/0129808 A1 | 5/2015 | Mrozek et al. |
| 2015/0336292 A1 | 11/2015 | Mikulak |
| 2016/0007474 A1 | 1/2016 | Dardona et al. |
| 2016/0137900 A1 | 5/2016 | Lin |
| 2016/0185009 A1 | 6/2016 | Keshavan et al. |
| 2016/0236414 A1* | 8/2016 | Reese .................... B33Y 50/02 |
| 2016/0297142 A1* | 10/2016 | Bheda .................. C09D 11/324 |
| 2016/0351300 A1 | 12/2016 | Daniel et al. |
| 2017/0054118 A1 | 2/2017 | Aston et al. |
| 2017/0129170 A1 | 5/2017 | Kim et al. |
| 2017/0321083 A1 | 11/2017 | Fenn et al. |

* cited by examiner

SOLID-STATE ADDITIVE MANUFACTURING METHODS FOR COMPOUNDING CONDUCTIVE POLYMER COMPOSITIONS

CROSS-REFERENCE TO RELATED APPLICATIONS

The present application relies on the disclosure of and claims priority to and the benefit of the filing date of U.S. Provisional Application Nos. 62/729,836, filed Sep. 11, 2018, and 62/740,758, filed Oct. 3, 2018, each of which is hereby incorporated by reference in their entireties. The present application is also a continuation application of PCT/US2019/050595 filed on Sep. 11, 2019.

BACKGROUND OF THE INVENTION

Field of the Invention

The present invention is directed to the field of solid-state additive manufacturing. More particularly, embodiments of the invention relate to methods of solid-state additive manufacturing of products with one or more conductive polymer. Embodiments also relate to methods of solid-state additive manufacturing which incorporate plastic waste as feed material. The methods are performed with a solid-state additive manufacturing machine which includes one or more of a feeding unit, a spindle, a tool, a motor, a driving unit, a control unit, a monitoring unit, a power supply and a process control software; wherein the spindle and the tool each have an internal passageway indirectly or directly in operable communication with each other for a filler material to pass from the feeding unit through the internal passageways of the spindle and tool to a workpiece. The solid-state additive manufacturing machine generates severe plastic deformation of the filler material by applying normal, shear and/or frictional forces by way of a rotating shoulder of the tool such that the filler material is in a malleable and/or viscoelastic state in an interface region, thereby producing a formed conductive polymer or plastic composition or 3D printed layer or object with incorporated plastic waste. Embodiments also relate to products produced by the disclosed methods.

Description of Related Art

Conductive Plastics

Plastics are typically electrically- and thermally-insulating materials. The interest in conductive plastics has been prompted by numerous advantages which these plastics offer in comparison to metals, such as tunable conductivity, lighter weight, inherent corrosion/oxidation resistance, a wide range of available properties, design flexibility and good processability (including printing in desirable 3D-shapes), scalability, economics (lower cost than metals and machined parts; lower shipping costs), and recycling opportunity.

In many applications, the fabrication of conductive plastic parts is preferred due to their light weight and affordability which results from the elimination of secondary processes often required in metal processing. Also, most plastics are resistant to denting, chipping, scratching, corrosion and chemicals.

Electrically Conductive Plastics

Plastics charge very easily due to their insulating nature; even when grounded, the plastic material stays charged with static electricity. Charged plastic materials could cause a risk for uncontrolled electrostatic discharge (ESD). Even grounding would not remove the electrical charges from a common (insulating) plastic material. Conductive plastic compounds, unlike insulating plastics, have the ability to conduct electricity. When grounded, conductive plastics remain in zero potential as they do not accumulate static electricity. Over the years, electrically conducting polymers have been developed by adding conductive fillers, such as carbon black, graphite, metallic fibers, flakes, carbon fibers and nano-size fillers, such as carbon nanotubes and metal nanoparticles.

The use of plastic materials is restricted in applications in which uncontrolled electrostatic discharges must be prevented and eliminated. Non-charging (i.e. dissipative) conductive plastic compounds ensure safe dissipation of electrical charges. One of the largest application areas for electrically conductive plastic compounds is found in the electronics industry. For instance, in electronics production, the most critical production steps are performed in a special ESD Protected Area (EPA). Inside the EPA, all the objects as well as workers must be grounded to the same potential. All of the plastic parts inside the EPA should be composed of electrically conductive plastic compounds. Electrically conductive plastic compounds are also required for the packaging of sensitive electronics components, and are also used in aerospace components, medical devices, and the automotive, computer and appliance industries; specific applications include automotive fuel systems, conductive storage containers for inks and hazardous liquids, in medical devices, e.g. aerosol devices, where such plastics ensure that an aerosol device dispenses a full dose of a powder or a liquid without the substances adhering to the device itself. A defined range of plastics conductivity is required for control units, sensors and enclosures.

Other uses of electrically conductive plastics include electrostatic discharge (ESD) control and electromagnetic interference (EMI) shielding applications. Electromagnetic (EM) shielding is the practice of surrounding electronics and cables with conductive or magnetic materials to guard against incoming or outgoing emissions of electromagnetic frequencies (EMF). EM shielding is conducted for several reasons. The most common purpose is to prevent electromagnetic interference (EMI) from affecting sensitive electronics. Aircraft lightning protection has been demonstrated with conductive-particle-filled polymer composites.

There are also certain polymers, e.g. polyaniline, polythiophene and polypyrrole, which could inherently conduct electricity, but they're often unstable conductors (sensitive to oxygen and moisture exposure), have low conductivity rates and are difficult to process.

Thermally Conductive Plastics

Plastics' thermal insulation, although beneficial in certain applications, limits the utility of plastics in many heat generating applications, because such insulation causes undesirable effects, such as hot spots and increased device temperature. Thermally conductive plastics, or so-called plastics with thermal management capability, are engineered to combine the heat transfer and cooling capabilities of metals with the design freedom, weight reduction and cost advantages of thermoplastic materials. Imparting thermal conductivity to plastics by adding fillers changes the way a plastic part responds to applied heat, because heat management is critical to the performance, lifetime, and reliability of electronic devices. A "good" thermally conductive plastic material manages the thermal energy rather than merely survive the applied thermal energy.

Applications where thermally conductive plastic parts will be useful include numerous thermal management applications, such as heat sinks and other heat-removal parts such as in applications where there is heat build-up in electronics, appliances, lighting (e.g. LED lights), automotive products, and many other industrial products. Sensors' plastic housings require conductive plastics. For instance, with temperature sensors, thermally conductive plastic encapsulation can help improve the response of the temperature sensor itself. Thermally conductive compounds are also used to encapsulate motors and motor bobbins. A fuel pump uses a thermally conductive plastic to help keep fuel flowing in sub-freezing temperatures.

Traditionally, aluminum has been the prime material for controlling higher heat fluxes in electronics. However, sometimes aluminum's high thermal conductivity cannot be effectively utilized, such as in instances where it conducts heat to the surface of a product faster than the air-flow convection can remove the heat from the surface. Heat transfer in many applications is convection-limited, not conduction-limited (e.g. material-dependent). Thermally conductive plastics could provide heat transfer equivalent to some metal designs. Usually for many applications where convection is the limiting factor, the thermally conductive plastics are a better fit than metals.

Furthermore, thermally conductive plastics typically have lower coefficients of thermal expansion (CTE) than metals and can thereby reduce stresses due to differential expansion; in fact, the plastics more closely match those of silicon or ceramics.

Conductive Plastics Compounding Challenges

There are some technical challenges associated with compounding and modifying plastics to improve their thermal and/or electrical conductivity. High initial cost is one of the biggest obstacles to wider acceptance of conductive plastic formulations. A key factor is high-priced fillers used to achieve good electrical and/or heat conduction, which result in conductive plastic formulations which cost much more than metals. Furthermore, creating conductive plastic materials is not a simple step of mixing the conductive fillers into the polymer matrix. Good dispersion and formation of a conductive network throughout the polymer is often required, which network would serve as a pathway for passing the electrical charges and/or the heat. Otherwise, if the conductive particles are not dispersed well throughout the insulating polymer medium, but form isolated aggregates, then the final composite will not be conductive at all; it will be a composite of conductive particles trapped into (or coated with) an insulating polymer.

To date, known mixing methods involve adding conductive particles usually in a molten state of the polymer, i.e. at temperatures above the melting point of the material, $T_m$, which requires energy to heat the polymer material above its $T_m$. And yet, many of these mixing methods result in aggregates of conductive particles or require high loading levels of conductive fillers to reach the required conductivity values.

Moreover, in order to ensure a high degree of electrical and/or thermal conductivity, a high concentration of conductive fillers is required, which might negatively affect other properties of the base polymer (e.g. processability, mechanical properties). Higher conductive filler content could yield a good conductive composition (under assumption that the filler is well-dispersed), but this content usually has a negative influence on the mechanical properties and processability of the base polymer (due to the considerable increase in melt viscosity). Therefore, for each material type, a compromise has to be made regarding the amount of the filler and desired properties.

Using nano-sized conductive particles vs. micron-sized conductive particles might solve the problem of high loading levels of conductive fillers. In general, the concentration at which the polymer composition becomes conductive is much lower, sometime an order of magnitude lower for compositions using nano-size conductive fillers compared to the compositions using micron-size conductive fillers. For instance, the percolation zone, i.e. the transition from insulating into conductive material, for a particular polymer might occur at 10-20 vol % micron-size conductive filler or at 0.5-1 vol % if the same conductive filler is used in nanometer-sized particles, under the assumption that good dispersion is achieved in both cases. Of course, the filler loading level is further affected by the morphology, particle shape and aspect ratio in the case of anisotropic filler particles.

Taking into account the above-mentioned challenges of creating a good dispersion of conductive fillers in a polymer matrix which results in a conductive polymer composition with a satisfactory electrical and/or thermal conductivity values, there is a need for a cost-efficient and mixing-effective method for formulating conductive polymer-based compositions and their deposition as conductive coatings and conductive parts.

Plastics Recycling

Plastics recycling is the process of recovering different types of plastic material in order to reprocess them into various other products, usually downsized products. The recycling of plastics helps save energy and natural resources that are required to make virgin plastics. In fact, 90% of plastics are made from non-renewable fossil fuels. By recycling the plastic waste, the waste will not be accumulated in landfills, occupying land and releasing toxic gases along with other types of waste. Most of this plastic waste that potentially could be recycled will end up in the oceans and landfills, in addition to the plastics that can't be recycled. The United Nations calls the plastic pollution in the oceans a "planetary crisis". Another study estimates the amount of plastics in the oceans would outnumber the fish (by weight) by 2050. Moreover, in the coming years, the plastics production is not going to slow down—it is expected to double in the next 20 years and nearly quadruple by 2050.

Plastics waste is becoming a big problem, but only 9% of plastics waste is recycled. There are many reasons for this, such as the technical hurdles required before recycling. The waste needs to go through several stages, e.g. sorting, washing, shredding, classification, and then, extruding or molding into a new product, usually a downsized product. Sorting is a time-consuming process required to separate different types of plastics, because only plastics of the same or similar properties can be recycled together and there are so many different varieties of plastics materials, many of which are made to be very durable and inert in the environment. Moreover, plastics can be only recycled a limited number of times before ending up in a landfill. Sometimes, the prices for recyclable plastic materials are higher than those of virgin plastics, because of lower oil prices, reduced demand for recycled plastics and their limited applications. Consequently, many of the plastic recycling companies are shutting down and there is limited interest in developing new technologies for plastics recycling.

The two main recycling methods for plastics are mechanical and chemical plastics recycling. Mechanical recycling is when the plastic is cut down into smaller pieces, washed, melted and remolded into a new product. Chemical recycling breaks the plastics' bonds at the molecular level. Each plastic material has characteristic bonds and specific catalysts (chemicals) are used to attack these particular bonds. Ideally, the plastic is broken down to a monomer level (the catalyst causes depolymerization), which monomers can then be used to make the same fresh or so called "virgin" plastic. However, chemical recycling usually requires very high temperatures and yields a mixture of multiple products that would need to be separated, another tedious and expensive process.

Therefore, there is a need for inexpensive technology that overcomes the above-mentioned challenges of plastics recycling and is capable of recycling a variety of plastic materials in a quick way without going through sorting and other tedious stages before recycling.

SUMMARY OF THE INVENTION

Embodiments of this disclosure are directed to cost-effective fabrication of conductive plastic compositions, conductive coatings, e.g. EMI shielding, anti-static (AS) and ESD coatings, and 3D-conductive plastic objects with the aid of solid-state additive manufacturing technology. Methods for in situ mixing of conductive fillers into thermoplastic polymer material and its subsequent deposition are disclosed. In addition, embodiments are directed to methods for recycling plastics waste by in situ shredding, mixing and subsequent deposition into 3D parts and coatings. Embodiments include any product produced by the disclosed methods.

Embodiments of the disclosure include, but are not limited to the following:

Embodiment 1 is a method comprising: forming a conductive polymer or plastic composition with at least one conductive filler and at least one polymer or plastic using solid-state additive manufacturing; and forming a conductive 3D object by depositing the conductive polymer or plastic composition as a conductive coating or layer in a multi-component part. Such methods include a method of forming a conductive polymer or plastic composition with at least one conductive filler and at least one polymer or plastic through a solid-state additive manufacturing process; wherein the solid-state additive manufacturing process includes: feeding the at least one conductive filler and the at least one polymer or plastic through a hollow spindle or tool of a solid-state additive manufacturing machine; depositing the at least one conductive filler onto or with the at least one polymer or plastic; and generating severe plastic deformation of the at least one conductive filler and the at least one polymer or plastic by applying normal, shear and/or frictional forces by way of a rotating shoulder of the hollow tool such that the at least one conductive filler and/or the at least one polymer or plastic are in a malleable and/or visco-elastic state in an interface region, thereby producing the formed conductive polymer or plastic composition.

Embodiment 2 is the method of Embodiment 1, wherein the conductive polymer or plastic composition comprises a conductive coating, conductive layer or conductive 3D object.

Embodiment 3 is the method of Embodiment 1 or Embodiment 2, wherein the conductive polymer or plastic composition is a thermally conductive but electrically insulating composition.

Embodiment 4 is the method of any one of Embodiments 1-3, wherein the conductive polymer or plastic composition is an electrically conductive but thermally insulating composition.

Embodiment 5 is the method of any one of Embodiments 1-4, wherein the conductive polymer or plastic composition is a thermally- and electrically-conductive composition.

Embodiment 6 is the method of any one of Embodiments 1-5, wherein the conductive polymer or plastic composition is deposited on a non-conductive substrate or object.

Embodiment 7 is the method of any one of Embodiments 1-6, wherein the conductive polymer or plastic composition is deposited on a conductive substrate or object.

Embodiment 8 is the method of any one of Embodiments 1-7, wherein the conductive polymer or plastic composition is deposited to form an anti-static (AS) coating.

Embodiment 9 is the method of any one of Embodiments 1-8, wherein the conductive polymer or plastic composition is deposited to form an electrostatic discharge (ESD) coating.

Embodiment 10 is the method of any one of Embodiments 1-9, wherein the conductive polymer or plastic composition is deposited to form an electromagnetic interference (EMI) shielding coating.

Embodiment 11 is the method of any one of Embodiments 1-10, wherein the conductivity of the plastic composition is higher than $10^2$ S/cm.

Embodiment 12 is the method of any one of Embodiments 1-11, wherein the conductivity of the plastic composition is higher than 1 S/cm.

Embodiment 13 is the method of any one of Embodiments 1-12, wherein the conductive polymer or plastic composition is deposited to form a coating or object with good heat management properties.

Embodiment 14 is the method of any one of Embodiments 1-13, wherein the thermal conductivity of the plastic composition is higher than 1 W/mK.

Embodiment 15 is the method of any one of Embodiments 1-14, wherein the thermal conductivity of the plastic composition is higher than 10 W/mK.

Embodiment 16 is the method of any one of Embodiments 1-15, wherein the conductive polymer or plastic composition comprises micron-size conductive fillers.

Embodiment 17 is the method of any one of Embodiments 1-16, wherein the conductive polymer or plastic composition comprises nano-size conductive fillers.

Embodiment 18 is the method of any one of Embodiments 1-17, wherein the conductive polymer or plastic composition and/or conductive filler comprises carbon nanotubes (CNT).

Embodiment 19 is the method of any one of Embodiments 1-18, wherein the conductive polymer or plastic composition and/or conductive filler comprises carbon black.

Embodiment 20 is the method of any one of Embodiments 1-19, wherein the conductive polymer or plastic composition and/or conductive filler comprises graphite.

Embodiment 21 is the method of any one of Embodiments 1-20, wherein the conductive polymer or plastic composition and/or conductive filler comprises graphene.

Embodiment 22 is the method of any one of Embodiments 1-21, wherein the conductive polymer or plastic composition and/or conductive filler comprises BN.

Embodiment 23 is the method of any one of Embodiments 1-22, wherein the conductive polymer or plastic composition and/or conductive filler comprises $Al_2O_3$.

Embodiment 24 is the method of any one of Embodiments 1-23, wherein the conductive polymer or plastic composition and/or conductive filler comprises AN.

Embodiment 25 is the method of any one of Embodiments 1-24, wherein the conductive polymer or plastic composition and/or conductive filler comprises chopped steel fibers.

Embodiment 26 is the method of any one of Embodiments 1-25, wherein the conductive polymer or plastic composition and/or conductive filler comprises chopped copper fibers.

Embodiment 27 is the method of any one of Embodiments 1-26, wherein the conductive polymer or plastic composition and/or conductive filler comprises metal particles.

Embodiment 28 is the method of any one of Embodiments 1-27, wherein the conductive polymer or plastic composition and/or conductive filler comprises metal oxide particles.

Embodiment 29 is the method of any one of Embodiments 1-28, wherein the conductive polymer or plastic composition and/or conductive filler comprises two or more different types of conductive fillers.

Embodiment 30 is the method of any one of Embodiments 1-29, wherein the conductive polymer or plastic composition has a coefficient of thermal expansion (CTE) of less than $5 \times 10^6/°$ C.

Embodiment 31 is the method of any one of Embodiments 1-30, wherein during deposition the at least one conductive filler forms a 3D network within the conductive polymer or plastic composition.

Embodiment 32 is the method of any one of Embodiments 1-31, wherein one or more solid-state additive manufacturing process parameters are adjusted so that the at least one conductive filler forms a 3D network within the conductive polymer or plastic composition.

Embodiment 33 is the method of any one of Embodiments 1-32, wherein the one or more solid-state additive manufacturing process parameters comprise filler material temperature, spindle temperature, tool temperature, tool position, down force, tool pressure, spindle torque, spindle angular velocity, tool torque, tool transverse velocity, tool angular velocity, filler material flow rate, gas flow rate, and vibration.

Embodiment 34 is the method of any one of Embodiments 1-33, wherein the at least one conductive filler is a semiconductor.

Embodiment 35 is the method of any one of Embodiments 1-34, wherein the at least one conductive filler is ceramic.

Embodiment 36 is the method of any one of Embodiments 1-35, wherein the at least one polymer or plastic comprises reactive monomers.

Embodiment 37 is the method of any one of Embodiments 1-36, wherein during the deposition step the reactive monomers are cross-linked with the aid of light and/or heat.

Embodiment 38 is a plastics recycling method comprising: providing one or more plastic waste as a first material; and processing the one or more plastic waste material using a solid-state additive manufacturing machine by adjusting one or more process parameters in a manner which transforms the one or more plastic waste into one or more 3D printed layers or objects. Such methods include a method of recycling plastic waste with a solid-state additive manufacturing machine, which method includes: providing a first material comprising plastic waste into the solid-state additive manufacturing machine; adjusting one or more solid-state additive manufacturing process parameters in a manner which incorporates the plastic waste into a 3D printed layer or object resulting from the solid-state additive manufacturing process; wherein the solid-state additive manufacturing process includes: feeding the first material through a hollow spindle or tool of the solid-state additive manufacturing machine; depositing the first material onto a second material, wherein the first material is below its melting point (Tm) during deposition; and generating severe plastic deformation of the first material by applying normal, shear and/or frictional forces by way of a rotating shoulder of the hollow tool such that the first and second material are in a malleable and/or visco-elastic state in an interface region, thereby producing the resultant solid-state additive manufacturing 3D printed layer or object with the incorporated plastic waste.

Embodiment 39 is the method of Embodiment 38, wherein one or more of the solid-state additive manufacturing process parameters are adjusted in a manner to cause severe plastic deformation of the first material by applying normal, shear and/or frictional forces.

Embodiment 40 is the method of Embodiment 38 or Embodiment 39, wherein the solid-state additive manufacturing process causes a malleable state in the surface region of the second material on which the deformed first material is deposited onto by way of a rotating shoulder of the hollow tool.

Embodiment 41 is the method of any one of Embodiments 38-40, further comprising deposition of one or more layers of the first material onto the second material.

Embodiment 42 is the method of any one of Embodiments 38-41, wherein the first material comprises a mixture of plastic waste and virgin plastics and is provided as a single feedstock.

Embodiment 43 is the method of any one of Embodiments 38-42, wherein the first material comprises plastic waste and virgin plastic material which are provided as separate feedstocks.

Embodiment 44 is the method of any one of Embodiments 38-43, wherein the first material comprises a mixture of plastics waste and metals provided as a single feedstock.

Embodiment 45 is the method of any one of Embodiments 38-44, wherein the first material comprises plastic waste and metal materials provided as separate feedstocks.

Embodiment 46 is the method of any one of Embodiments 38-45, wherein the first material comprises a mixture of plastics waste and ceramics provided as a single feedstock.

Embodiment 47 is the method of any one of Embodiments 38-46, wherein the first material comprises a plastic waste and ceramic materials provided as separate feedstocks.

Embodiment 48 is the method of any one of Embodiments 38-47, wherein the first material comprises a mixture of plastics waste and reinforcing particles.

Embodiment 49 is the method of any one of Embodiments 38-48, wherein the first material comprises a mixture of plastics waste and reinforcing fibers.

Embodiment 50 is the method of any one of Embodiments 38-49, wherein the first material comprises a mixture of plastics waste and chopped reinforcing fibers.

Embodiment 51 is the method of any one of Embodiments 38-50, wherein the first material comprises a mixture of plastics waste and a lubricant.

Embodiment 52 is the method of any one of Embodiments 38-51, wherein the first material comprises a mixture of plastics waste and micro-particles.

Embodiment 53 is the method of any one of Embodiments 38-52, wherein the first material comprises a mixture of plastics waste and nano-particles.

Embodiment 54 is the method of any one of Embodiments 38-53, further comprising supplying a gas during deposition of the first material to form a porous deposit.

Embodiment 55 is the method of any one of Embodiments 38-54, wherein the first material comprises a first batch comprising plastic waste and a second batch comprising virgin plastics, resulting in deposition of alternate layers of waste and virgin plastics.

Embodiment 56 is the method of any one of Embodiments 38-55, wherein the first material comprises a first batch comprising plastic waste and a second batch comprising metals, resulting in deposition of alternate layers of waste plastics and metal.

Embodiment 57 is the method of any one of Embodiments 38-56, wherein the first material comprises a first batch of plastic waste and a second batch of ceramics, resulting in deposition of alternate layers of waste plastics and ceramics.

Embodiment 58 is the method of any one of Embodiments 38-57, wherein the first material comprises plastic waste and virgin plastics as feed materials that are gradually changing from around 0% by volume plastic waste to around 100% by volume plastic waste, or from around 0% by volume virgin plastics to around 100% by volume virgin plastics.

Embodiment 59 is the method of any one of Embodiments 38-58, wherein the first material comprises plastic waste in the form of plastic granules, beads, pellets, powder or irregular pieces produced by shredding used plastic objects, such as plastic bottles, plastic bags, and/or plastic cups.

Embodiment 60 is the method of any one of Embodiments 38-59, further comprising shredding used plastic objects into smaller pieces to provide the plastic waste for the first material.

Embodiment 61 is the method of any one of Embodiments 38-60, wherein the second material comprises plastic such that the first material comprising the plastic waste is deposited onto a plastic substrate.

Embodiment 62 is the method of any one of Embodiments 38-61, wherein the second material comprises metal such that the first material comprising the plastic waste is depositing onto a metal substrate.

Embodiment 63 is the method of any one of Embodiments 38-62, wherein the second material comprises ceramic such that the first material comprising the plastic waste is deposited onto a ceramic substrate.

Embodiment 64 is the method of any one of Embodiments 38-63, wherein the resultant solid-state additive manufacturing 3D printed layer or object with the incorporated plastic waste is a 3D object.

Embodiment 65 is the method of any one of Embodiments 38-64, wherein the resultant solid-state additive manufacturing 3D printed layer or object with the incorporated plastic waste is a surface coating.

Embodiment 66 is the method of any one of Embodiments 38-65, wherein the resultant solid-state additive manufacturing 3D printed layer or object with the incorporated plastic waste is a plastic block.

Embodiment 67 is the method of any one of Embodiments 38-66, wherein the one or more solid-state additive manufacturing process parameters comprise one or more of filler material temperature, spindle temperature, tool temperature, tool position, downward force, tool pressure, spindle torque, spindle angular velocity, tool torque, tool transverse velocity, tool angular velocity, filler material flow rate, gas flow rate, and/or vibration.

Embodiment 68 is the method of any one of Embodiments 38-67, wherein the plastic waste comprises one or more of the following plastics: PET (Polyethylene Terephthalate), HDPE (High-Density Polyethylene), PVC (Polyvinyl Chloride), LDPE (Low-Density Polyethylene), PP (Polypropylene), PS (Polystyrene), Other plastics, such as Acrylic, Nylon, Polycarbonate and Polylactic acid (PLA).

Embodiment 69 is a 3D printed layer, object, or product produced by the method of any one of Embodiments 38-68.

Embodiment 70 is the 3D printed layer, object, or product of Embodiment 69, wherein the plastic waste or recycled plastic comprises one or more of the following plastics: PET (Polyethylene Terephthalate), HDPE (High-Density Polyethylene), PVC (Polyvinyl Chloride), LDPE (Low-Density Polyethylene), PP (Polypropylene), PS (Polystyrene), Other plastics, such as Acrylic, Nylon, Polycarbonate and Polylactic acid (PLA).

Embodiment 71 is the 3D printed layer, object, or product of Embodiment 69 or Embodiment 70, wherein the plastic waste or recycled plastic comprises rigid plastic.

Embodiment 72 is the 3D printed layer, object, or product of any one of Embodiments 69-71, which is or is a component of a plastic pipe, plastic tile, or plastic block.

Embodiment 73 is a 3D printed object comprising a first layer adjacent to a second layer, which first layer comprises plastic waste or recycled plastic and which second layer comprises virgin plastic.

Embodiment 74 is a 3D printed object comprising a first layer adjacent to a second layer, which first layer comprises plastic waste or recycled plastic and which second layer comprises no plastic.

Embodiment 75 is the 3D printed object of Embodiment 74, wherein the second layer comprises metal.

Embodiment 76 is the 3D printed object of Embodiment 74, wherein the second layer comprises ceramic.

Embodiment 77 is the 3D printed object of Embodiment 74, wherein the second layer comprises both metal and ceramic.

Embodiment 78 is a 3D printed object comprising a first layer adjacent to a second layer, which first layer comprises a first waste plastic and which second layer comprises a second waste plastic which is different from the waste plastic of the first layer.

Embodiment 79 is the 3D printed object of Embodiment 78, which first waste plastic and second waste plastic are selected from the following plastics: PET (Polyethylene Terephthalate), HDPE (High-Density Polyethylene), PVC (Polyvinyl Chloride), LDPE (Low-Density Polyethylene), PP (Polypropylene), PS (Polystyrene), Other plastics, such as Acrylic, Nylon, Polycarbonate and Polylactic acid (PLA).

Embodiment 80 is the 3D printed object of Embodiment 78 or Embodiment 79, which is a plastic pipe, plastic tile, or plastic block.

These and other Embodiments will be elaborated upon in the foregoing Detailed Description.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 5A is a schematic illustration of a solid-state additive manufacturing-deposited plastic waste layer on a substrate according to an embodiment, while FIG. 5D is a schematic illustration of a solid-state additive manufacturing generated compositional gradient along the translational direction using virgin and waste plastic as feedstock according to an embodiment, while

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As used herein, the term "solid-state additive manufacturing" refers to and is interchangeable with "additive friction stir" and/or any process described herein, such as manufacturing processes using a rotatable and/or translatable tool that delivers feedstock through the tool and processes the feedstock and/or substrate in a manner to deform one or both of the feedstock and/or substrate, in whole or part, to allow for joining of the feedstock and substrate and/or one or more additional structural feature.

As used herein, the term "coating material" is used interchangeably with "filler material" and/or "feedstock" and/or "consumable" and/or "consumable material," which each independently or collectively relate to an additive material which is fed through a throat of a rotating stirring tool as described in this disclosure.

Figure 1:
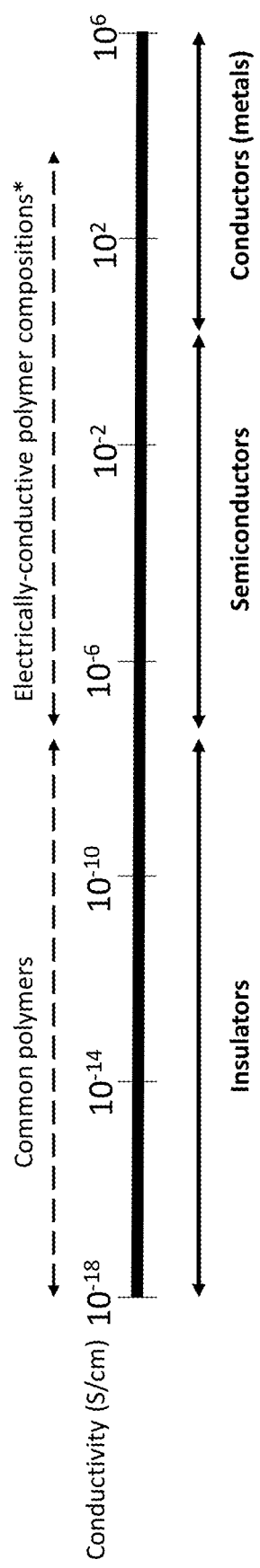
FIG. 1 is a diagram providing electrical conductivity values for insulating, semiconducting and conductive materials, where the electrically conductive polymer compositions are made by different methods (other than by solid-state additive manufacturing) of dispersion of conductive fillers in a polymer matrix.

Solid-state additive manufacturing technology offers a possibility for in situ mixing and dispersion of conductive filler particles in a thermoplastic matrix without melting the matrix, while rendering the resulting product electrically and/or thermally conductive. A diagram providing electrical conductivity values for insulating, semiconducting and conductive materials, where the electrically conductive polymer compositions are made by different methods (other than by solid-state additive manufacturing) of dispersion of conductive fillers in a polymer matrix is provided in FIG. 1.

Solid-state additive manufacturing technology is an environmentally friendly technology operating in an open atmosphere without melting the material. The solid-state additive manufacturing system deposits the material by thermo-mechanical means: the system causes a severe plastic deformation in the material due to a combination of different forces and rotation to make both the deposited material and the material being deposited onto malleable. The materials are in a solid state—a unique distinction from competing technologies. Due to the friction stirring action, individual grains/particles/pieces are broken up into smaller sizes and consolidated. The entire operation occurs in air making the solid-state additive manufacturing system less complex and less expensive to operate. After the solid-state additive manufacturing process is completed, there is no need for the additional steps required by competing melt-based processes, such as annealing or sintering.

The thermoplastic polymer being processed in the solid-state additive manufacturing process is in a visco-elastic state, i.e. at temperatures above the glass transition temperature of the material, $T_g$, but still below its melting point, $T_m$, which is a main distinction from all the other known methods for particle dispersion in polymeric materials. This also means solid-state additive manufacturing processes have lower energy costs in comparison to other known processes, as there is no need for energy to melt the material. The addition of conductive fillers and their dispersion in the polymer are facilitated by intense forces, friction forces and other types of forces generated within the solid-state additive manufacturing system, which forces reduce the viscosity of the polymer, which is not in a molten state. Furthermore, the solid-state additive manufacturing system is capable of simultaneously depositing the in situ generated conductive compositions into desired 3D objects, layers and/or coatings.

Solid-state additive manufacturing technology is capable of in situ shredding, mixing and consolidating different plastic materials and subsequent printing into desirable 3D shapes or coatings. Thus, solid-state additive manufacturing technology is an inexpensive way of processing a variety of used plastic materials and plastic objects without the need for the preliminary stages required in the conventional plastic recycling industry.

Figure 2A:
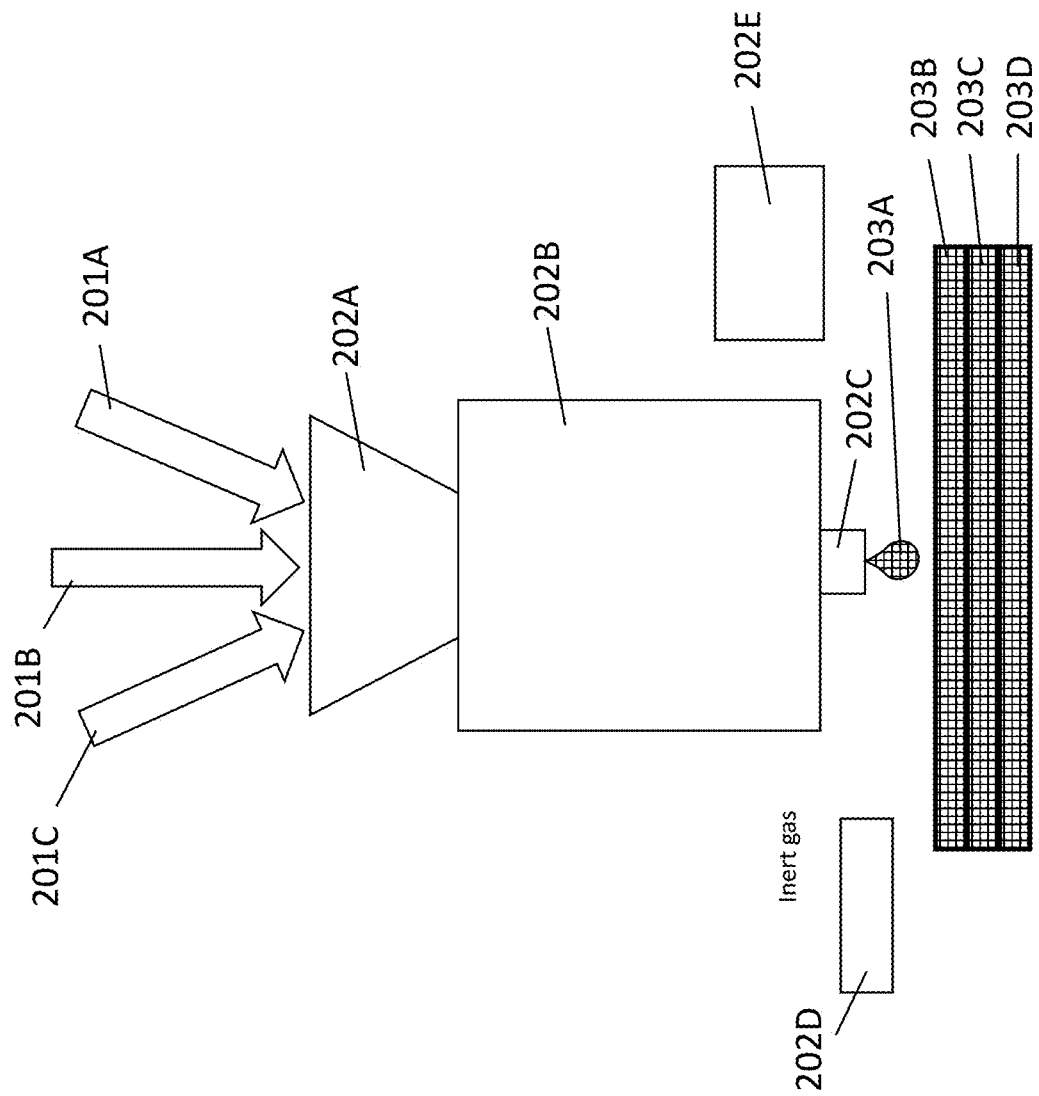
FIGS. 2A and 2B are schematic diagrams of a solid-state additive manufacturing system capable of in situ compounding and deposition of conductive plastic layers and coatings over exiting parts according to embodiments.

In some aspects, the addition of conductive particles to a polymer material (or a plastic formulation) contribute to improvement of both the electrical and thermal conductivities of the base polymeric material. In other aspects, the added conductive particles yield improvement in the electrical conductivity of the matrix material, and yet in another aspects, the conductive additives increase the thermal conductivity only. FIG. 2A is a schematic presentation of a solid-state additive manufacturing system capable of in situ compounding of a conductive plastic formulation and its subsequent deposition. The system comprises a feeding section (hopper) 202A, where the feedstock 201 (or multiple feedstock streams 201A, 201B, 201C) enter the solid-state additive manufacturing system. The raw polymer or plastic formulation (201A) used as a feedstock in the solid-state additive manufacturing system is a virgin polymer or used (recycled) plastic supplied in, without limitation, any of the following forms: granules, powder, pellets, wires, bars, sheets and/or their combination. The conductive fillers are also supplied as a continuous or discontinuous feeding stream, e.g. 201B into the system. When needed, a variety of other additives, e.g. surfactants, stabilizers and so on (201C), are added to enable good dispersion and miscibility between the polymer matrix and conductive particles. The feedstock then goes through the spindle 202B of the solid-state additive manufacturing system, where the feedstock is transformed into a malleable state, and then is deposited on the substrate via a hollow tool 202C. Additional solid-state additive manufacturing system elements might include inert gas supply 202D, for cases where the material deposition is sensitive to air/oxygen, and a light source or heat source 202E, for cases where external energy supplied as ultraviolet (UV), visible or infrared (IR) light aids in the deposition of the conductive composition 203A.

Figure 2B:
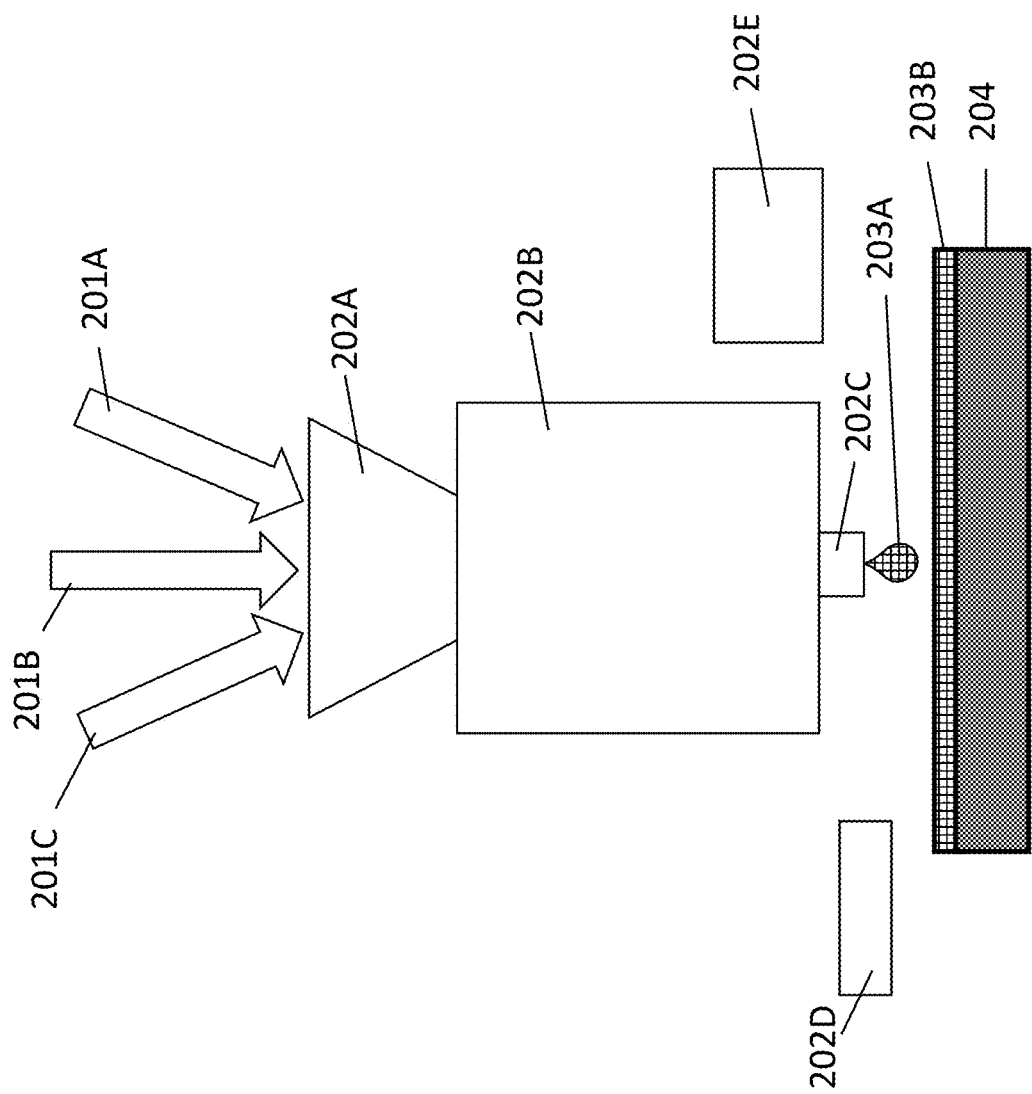

In some embodiments, the compounded conductive composition 203A is deposited in multiple layers 203B, 203C and 203D to build a 3D structure or part (FIG. 2A). In other embodiments, the compounded conductive composition 203A is deposited as a conductive coating or a conductive layer 203B on top of an existing substrate, structure, or part 204 (FIG. 2B).

Figure 3C:
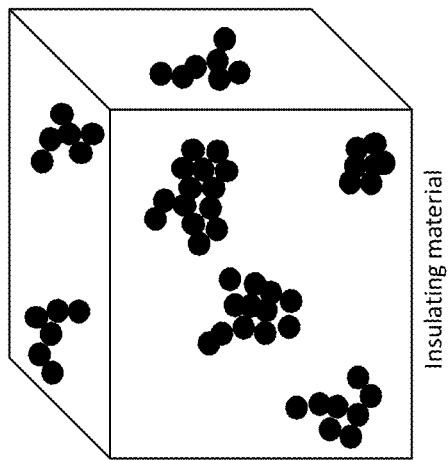
FIGS. 3A-3H are schematic illustrations of potential examples of formation of insulating and "conductive" networks according to embodiments. The examples include: particle-type conductive fillers at low loading level not sufficient to form a 3D conductive network (FIG. 3A) and at higher loading level sufficient to form a 3D conductive network (FIG. 3B), as well as particle-type fillers forming isolated aggregates that do not yield a conductive 3D network (FIG. 3C). Needle-like or rod-like conductive fillers at low loading levels yielding insulating material (FIG. 3D) and at higher loading levels yielding a conductive network (FIGS. 3E and 3F) are provided as well. Examples of chopped fiber-type fillers at low loading levels and higher loading levels, resulting in insulating and conductive materials, respectively, are provided in FIGS. 3G and 3H.
Figure 3B:
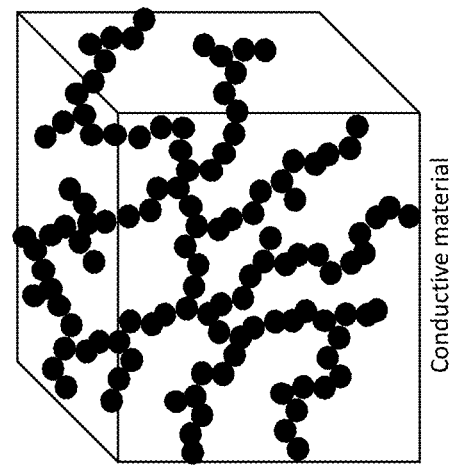
Figure 3A:
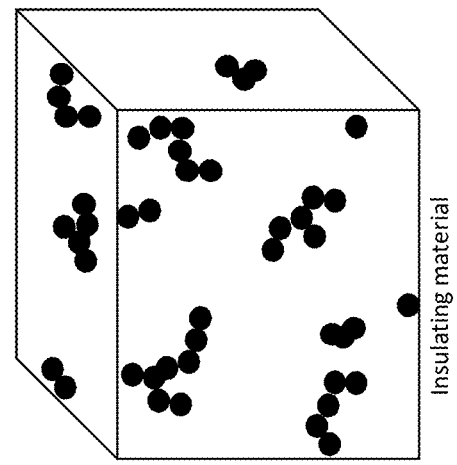

In some embodiments, by adjusting the solid-state additive manufacturing process parameters, such as the feeding rate, spindle and tool rotation, spindle and tool temperature, and torque, the solid-state additive manufacturing system provides a good dispersion of the conductive fillers and formation of a conductive 3D percolation network throughout the polymer (plastic material). The solid-state additive manufacturing process conditions are easily adjustable and controlled depending on the type of polymer matrix, its glass transition temperature ($T_g$) and melting temperature ($T_m$), friction coefficient and compression strength, among the other polymer properties. Examples include adding conductive particle-type fillers (FIGS. 3A, 3B and 3C), where a critical filler amount is needed to form a continued network of conductive particles (FIG. 3B), and thus, formation of a conductive material composition. At low loading levels, even at good dispersion process conditions, there is no formation of a continuous network in 3D space (FIG. 3A). When the solid-state additive manufacturing process conditions are not adjusted for the particular material type and the filler type, then the final composition will be an insulating material comprising clumps (aggregates) of the filler particles in an insulating medium (FIG. 3C).

Figure 3F:
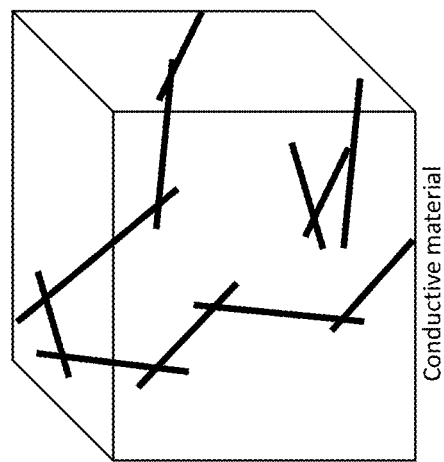
Figure 3E:
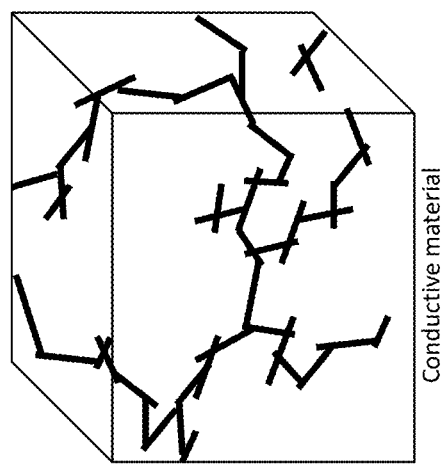
Figure 3D:
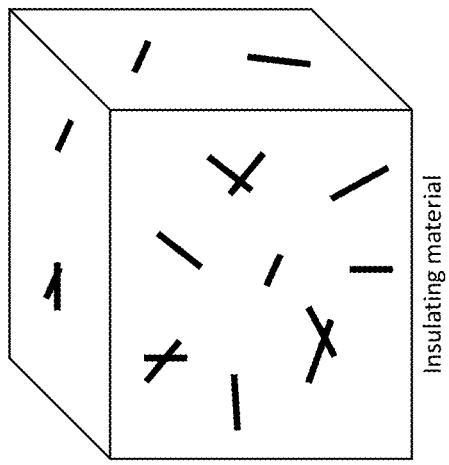

Other examples include dispersing conductive needle-like or rod-like fillers in insulating plastic materials (FIGS. 3D, 3E and 3F). At low loading levels, there is no 3D network formation of conductive fillers, and thus, the result is an insulating composite material (FIG. 3D). At higher loading levels, a 3D conductive network is formed depending on the filler's aspect ratio (FIGS. 3E and 3F). Higher aspect ratio fillers (FIG. 3F) will yield a 3D network at a much lower loading level than fillers with a smaller aspect ratio (FIG. 3E). In general, the loading level for rod-like fillers is usually much lower than the loading level of the particle type filler to form a 3D network within the same plastic material.

Figure 3H:
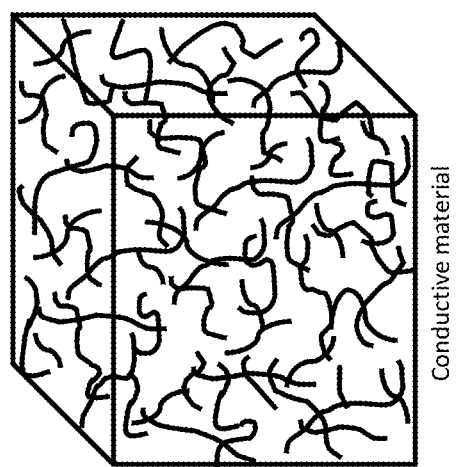
Figure 3G:
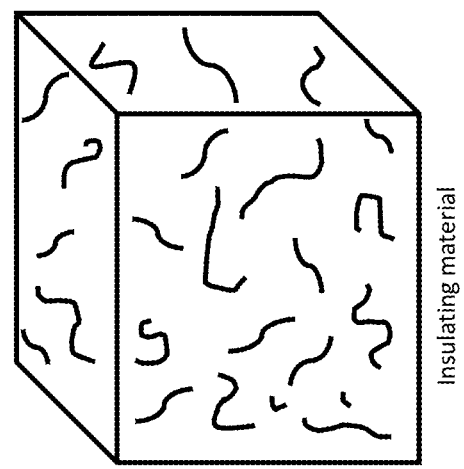

In certain examples, chopped conductive fibers, e.g. steel, copper, carbon fibers and others, are used as conductive fillers (FIGS. 3G and 3H). Preparation of a conductive composition (FIG. 3H), which is highly dependent on the filler aspect ratio and the loading level, is possible with particular solid-state additive manufacturing processing conditions that will give rise to high "fluidity" of the composition without melting it. FIG. 3G is a schematic of an insulating composition where the loading level of conductive fibers is lower than the critical level.

In some embodiments a combination of two or more fillers is used to achieve the required electrical conductivity and/or thermal conductivity value of the final solid-state additive manufacturing-processed composition. One example includes a mixture of graphene sheets' particles and spherical metal or metal oxide particles added to a plastic matrix to achieve the desired conductivity. Another example includes fiber-like or needle-like fillers combined with particle-type fillers to achieve the desired conductivity value at a much lower filler loading level than the levels needed if the individual fillers were used separately.

In certain aspects, polymer matrices, like polyamides (PAA), nylon 6 and 66 (Ny6, Ny66), polyphenyl sulfone (PPS), polysulfone (PSU), polybutylene terephthalate (PBT), acrylonitrile-butadiene-styrene (ABS), polyetherimide (PEI), polyesters, polycarbonate (PC), polystyrene (PS), polyolefines (PP, LDPE, HDPE), polyvinylchloride (PVC) and others are used for solid-state additive fabrication of conductive plastic compositions, conductive coatings and conductive parts.

In other aspects, thermoplastic elastomers are supplied in the solid-state additive manufacturing system along with conductive fillers to make conductive elastomeric compositions and parts.

In some aspects, a solid-state additive manufacturing compounded plastic formulation comprising reactive species (monomers) is additionally cross-linked with the aid of UV light or heat 202E during the solid-state additive manufacturing deposition step (FIG. 2A).

In certain embodiments, the plastic material is added in the solid-state additive manufacturing feeding system together with chopped steel fibers or steel powder to produce an EM shielding composition and its subsequent deposition over parts and surfaces that need EM shielding functionality. In the case of steel fiber filler, a high shielding effectiveness at lower loading level is possible in comparison to that obtained with powder or particle-filled plastic.

In other embodiments, single-walled and multi-walled carbon nanotubes (SW- and MW-CNT), carbon black, or other types of metal fibers or particles are added to a plastic material to make effective EMI shielding coatings or part-building layers.

In some embodiments, a plastic material in the solid-state additive manufacturing feeding system is blended together with chopped copper wire or copper powder/particles resulting in an electrically- and thermally-conductive plastic composition.

In some embodiments, solid-state additive manufacturing—compounded conductive thermoplastic compositions provide anti-static (AS) protection or protection from electrostatic discharge (ESD).

In certain aspects, electrically- and/or thermally-conductive fillers in the form of flakes, platelets or chopped sheets are used. Particular examples include thermally conductive, but electrically insulating plastic compositions with a low coefficient of thermal expansion and good mechanical strength for use in electronic packaging manufactured by the solid-state additive manufacturing process using ceramic conductive particles. For instance, ceramic particles such as BN, $SiO_2$, $Si_3N_4$, $Al_2O_3$, AN are used as conductive fillers in the solid-state additive fabrication of conductive plastics.

Solid-state additive manufacturing—compounded plastic formulations enable heat to be distributed evenly throughout the part and away from the heat source. Unlike traditional metals, which are good conductors but in many applications are limited by their convection cooling, solid-state additive manufacturing—compounded plastic compositions offer greater efficiency, because the convection rate and thermal conductivity rate are closely matched.

In certain embodiments, the electrical conductivity of the plastics may be enhanced by the addition of aluminum flakes, carbon fibers, carbon black powder, carbon nanotubes, stainless steel fibers, metal powder, and nickel-coated polymer fibers. In yet another example, graphene or graphite is used to fabricate conductive plastics by solid-state additive manufacturing technology.

In some embodiments, anisotropic conductive fillers with high aspect ratio, e.g. L/W>10, where L is the filler length and W is the filler width, are used in the solid-state additive manufacturing process. Lower filler loading levels (less than 10 vol %) are required to make solid-state additive manufacturing conductive plastic formulations than the formulations made with fillers of lower aspect ratio.

Furthermore, it is known that the thermal and electrical conductivity of filled plastic compositions depends on filler loading, filler morphology, filler aspect ratio and orientation (if any) and the overall composition micro- and nanostructure. In certain aspects, the solid-state additive manufacturing system coupled with particular process conditions is capable of uniquely distributing and orienting the fillers (in case of anisotropic fillers) in a low viscous plastic medium.

In some embodiments, graphite fibers or particles, which conduct electricity, as well as heat, are used in the solid-state additive manufacturing process of making conductive plastics for applications where Radio Frequency Interference (RFI) shielding is required, such as hand-held communication devices.

In other embodiments, ceramic additives which are heat-conductive, but electrically-insulative are added to the solid-state additive manufacturing—compounded plastic composition. Whereas common thermoplastics have a thermal conductivity of around 0.2 W/mK, i.e. are thermal insulators, certain examples of solid-state additive manufacturing—compounded plastics could have a conductivity in the range of 1-10 W/mK or even an order of magnitude higher.

Some embodiments include solid-state additive manufacturing—formulated plastic compositions with electrical conductivity values above $10^{-2}$ S/cm, and compositions with conductivity above 1 S/cm.

Certain embodiments are related to solid-state additive fabrication of plastics with anisotropic conductive properties, which is achieved by using liquid crystalline polymer (LCP) matrix and/or anisotropic conductive fillers. During the solid-state additive manufacturing deposition step, the LCP molecules and/or fillers become oriented in the deposited coatings or 3D objects.

Figure 4:
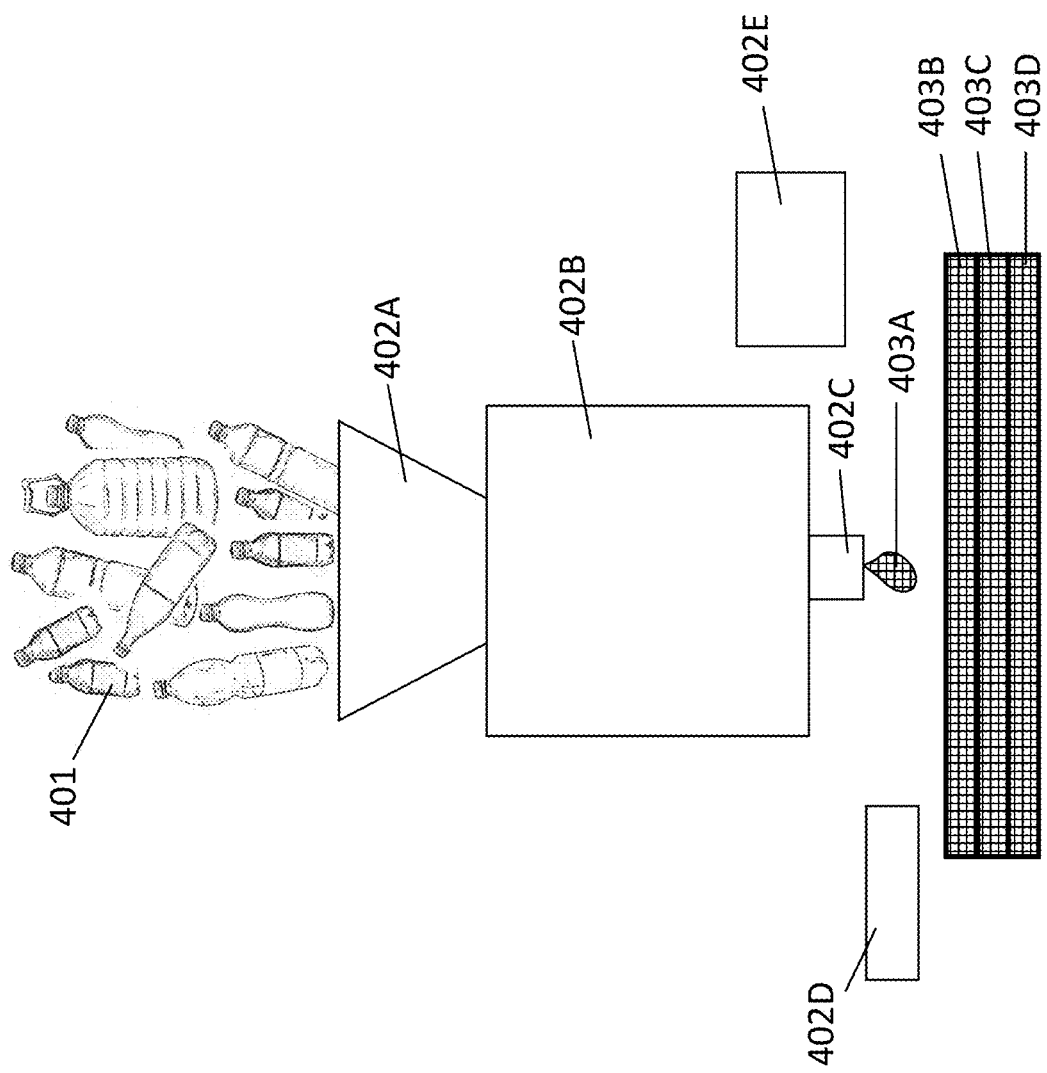
FIG. 4 is a schematic diagram of a solid-state additive manufacturing system capable of accepting and shredding various types of plastics waste and its subsequent deposition according to an embodiment.

In certain embodiments, the solid-state additive manufacturing feeding system is used for recycling polymer (plastic) waste (FIG. 4). For this purpose, the feeding section 402A comprises a hopper, and very often, a shredder. The hopper and shredder are designed to accept and process a variety of plastic materials and shapes. The shredder is designed to cut the plastics into smaller pieces. The system further comprises a spindle 402B, a hollow tool 402C, an inert gas supplying unit 402D and external field unit 402E (e.g. UV light source, heat source). The plastic waste 401 used as feedstock can be mixed with virgin plastics and/or additives, such as fillers, compatibilizers, and stabilizers.

In a specific embodiment, used plastic bottles usually made of polyethylene terephthalate (PET) serve as a feeding material in the solid-state additive manufacturing system. The bottle caps, usually made of a different plastic material, such as polypropylene (PP) or polyethylene (PE), do not need to be separated from the bottles, which is not the case with other plastics recycling technologies.

In another embodiment, used plastic bottles are mixed with other plastic waste, e.g. shopping plastic bags, in various ratios in the solid-state additive manufacturing feeding system, and processed together into 3D printed parts.

In some embodiments, polystyrene (PS) or polystyrene foam (e.g. Styrofoam) or both are used as a feeding material. In other embodiments, polyvinylchloride (PVC) shredded objects are used as feedstock in the solid-state additive manufacturing system.

According to embodiments, any or all of the following plastics, listed according to their standard Resin Identification Code (RIC) are used as feeding material:
  #1—PET (Polyethylene Terephthalate),
  #2—HDPE (High-Density Polyethylene),
  #3—PVC (Polyvinyl Chloride),
  #4—LDPE (Low-Density Polyethylene),
  #5—PP (Polypropylene),
  #6—PS (Polystyrene),
  #7—Other plastics, such as Acrylic, Nylon, Polycarbonate and Polylactic acid (PLA).

In embodiments, the feed of used plastics is turned into plastic foam by the solid-state additive manufacturing system. As an example, once the used plastic material is cut into small pieces, which are then severely deformed and consolidated, the material is deposited with the aid of a blown gas ($N_2$). The final deposited layers are porous, including open or closed pores or both depending on the solid-state additive manufacturing process conditions. In another example, two types of plastics with very different melting points ($T_m$) are used as a feedstock. During the solid-state additive manufacturing process, one of the materials (with lower $T_m$) decomposes into gases that form pores enclosed within the other deposited material (with higher $T_m$).

Figure 5A:
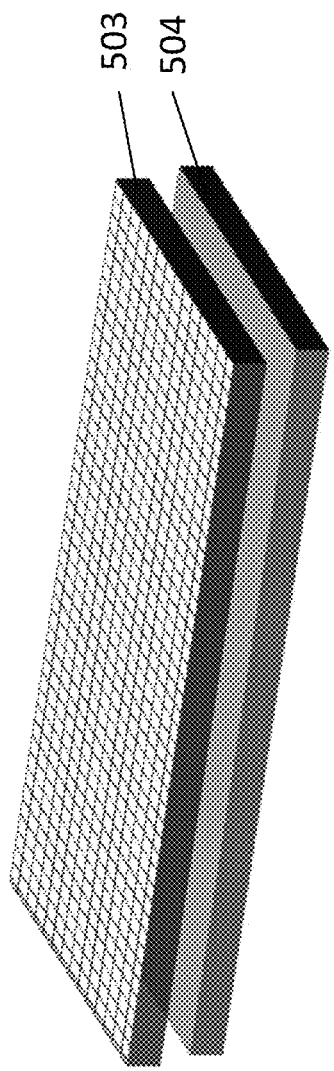

In some embodiments, the solid-state additive manufacturing—deposited layer 503 resulting from a plastic waste feedstock in the solid-state additive manufacturing system is deposited on a substrate 504 made of plastic, ceramic or metallic material (FIG. 5A).

Figure 5B:
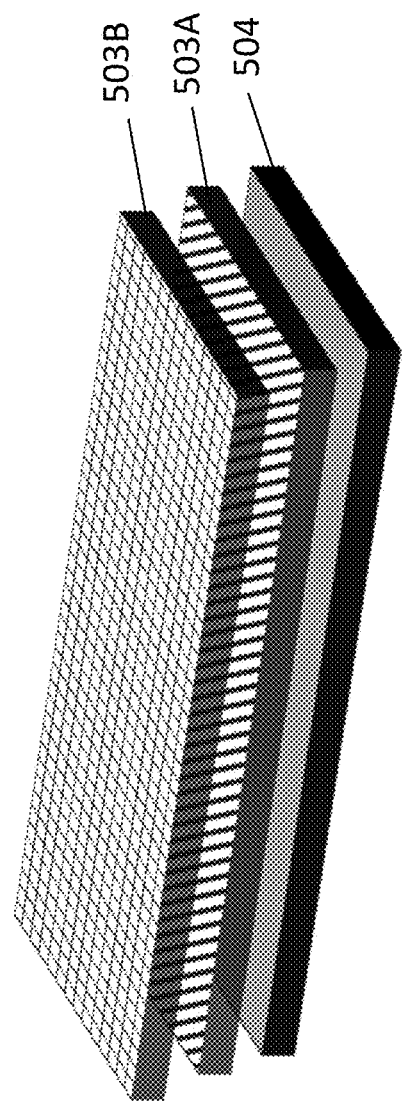
FIG. 5B is a schematic illustration of solid-state additive manufacturing deposition of two different layers from two different plastic waste feedstocks according to an embodiment.

In embodiments, a mixture of two or more different plastic waste materials or shredded plastic objects or their combination is used as a single feedstock in the solid-state additive manufacturing system, resulting in a recycled plastic layer made of different plastic materials. In other embodiments, different plastic waste materials are used as different feedstocks in the solid-state additive manufacturing machine and deposited as separate layers 503A and 503B (FIG. 5B).

Figure 5C:
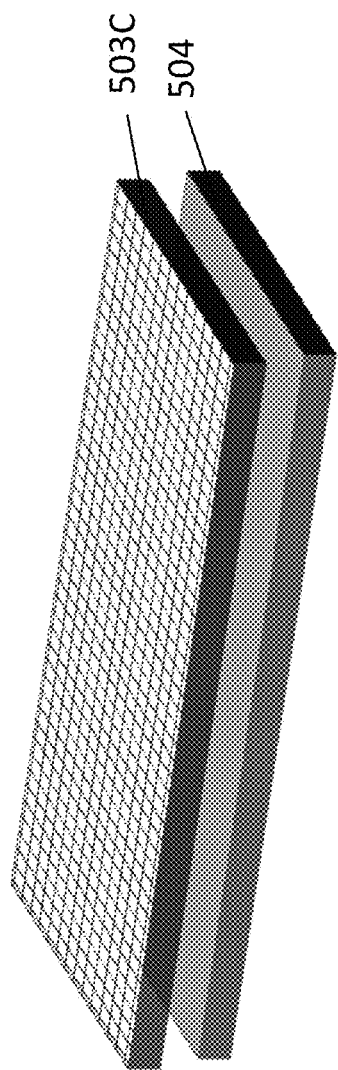
FIG. 5C is a schematic illustration of a solid-state additive manufacturing deposition of a layer from a feedstock comprising virgin and waste plastics according to an embodiment.

In particular embodiments, the virgin plastic and recycled plastic are mixed together in the feeding section and deposited as a single layer 503C on a substrate 504 (FIG. 5C).

In embodiments, virgin plastics (VP) and waste plastics (WP) in different volume percentages, ranging from VP/WP 0/100% by volume to around 100/0% by volume, are used as feedstocks in the solid-state additive manufacturing system. VP and WP can be mixed together simultaneously in different ratios in the feeding section of the solid-state additive manufacturing machine before they are being deposited. In some embodiments VP and WP are the same type of plastics, while in other embodiments, they are be different types of plastics.

Figure 5D:
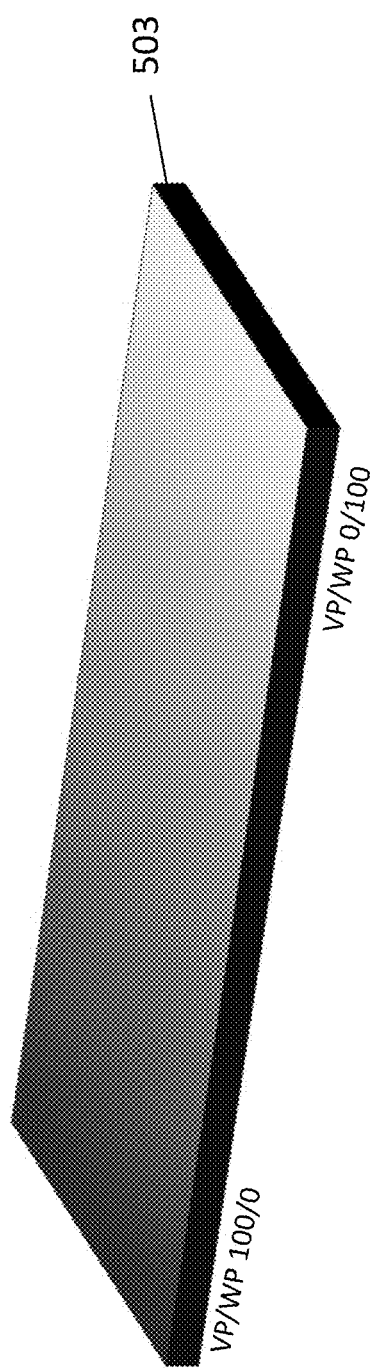
Figure 5E:
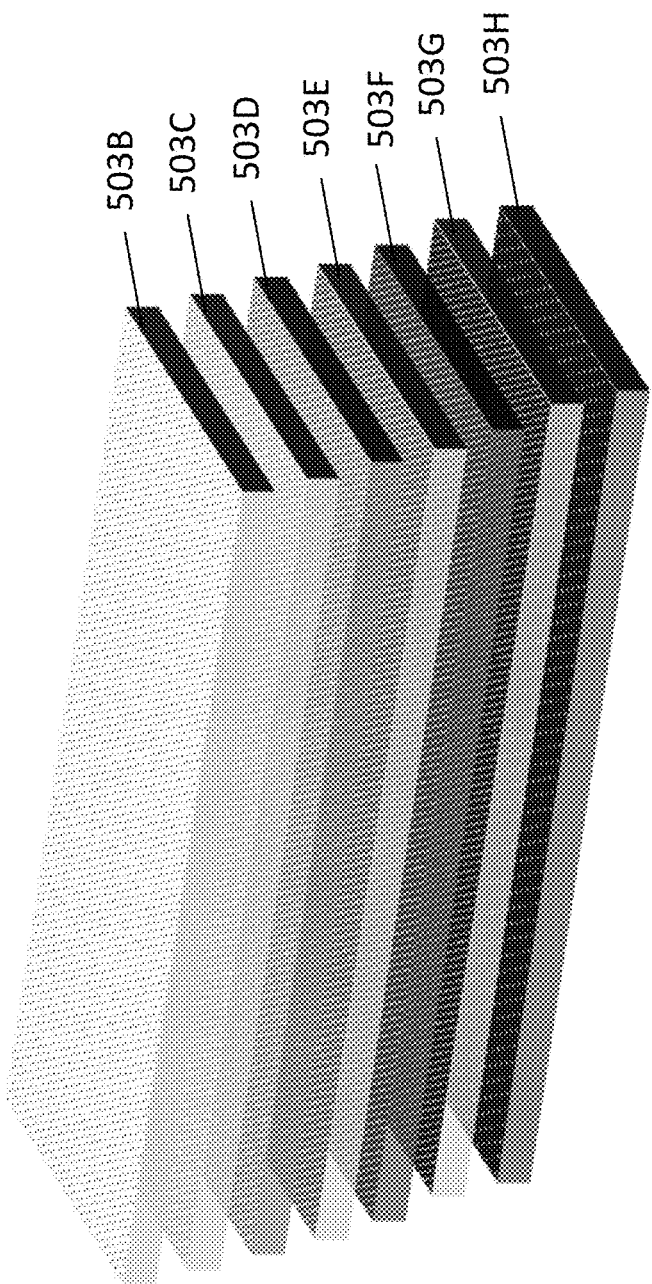
FIG. 5E is a schematic illustration of a solid-state additive manufacturing-generated compositional gradient along the thickness of deposited layers using virgin and waste plastic feedstocks at different ratios according to an embodiment.

In some embodiments, the VP/WP ratio is varied in the feedstock during the solid-state additive manufacturing deposition process yielding gradient composition in the solid-state additive manufacturing printed object or solid-state additive manufacturing deposited layers (FIGS. 5D and 5E). The compositional gradient can be achieved along the deposition direction i.e. translational direction in some embodiments (FIG. 5D), while in other embodiments, the gradient forms along the thickness of the deposited layers, 503B, 503C, 503D, 503E, 503F, 503G and 503H corresponding to e.g. VP/WP=0/100, 10/90, 30/70, 50/50, 70/30, 90/10 and 100/0, respectively, as presented in FIG. 5E.

In some examples, the compositional gradient can be any variation in terms of changing VP/WP ratio or the plastics type (e.g. Plastic A/Plastic B ratio) along the deposition direction or along the thickness of the deposited layers. In other examples, the gradient can be any variation in changing plastic/ceramic or plastic/metal ratio.

Figure 5F:
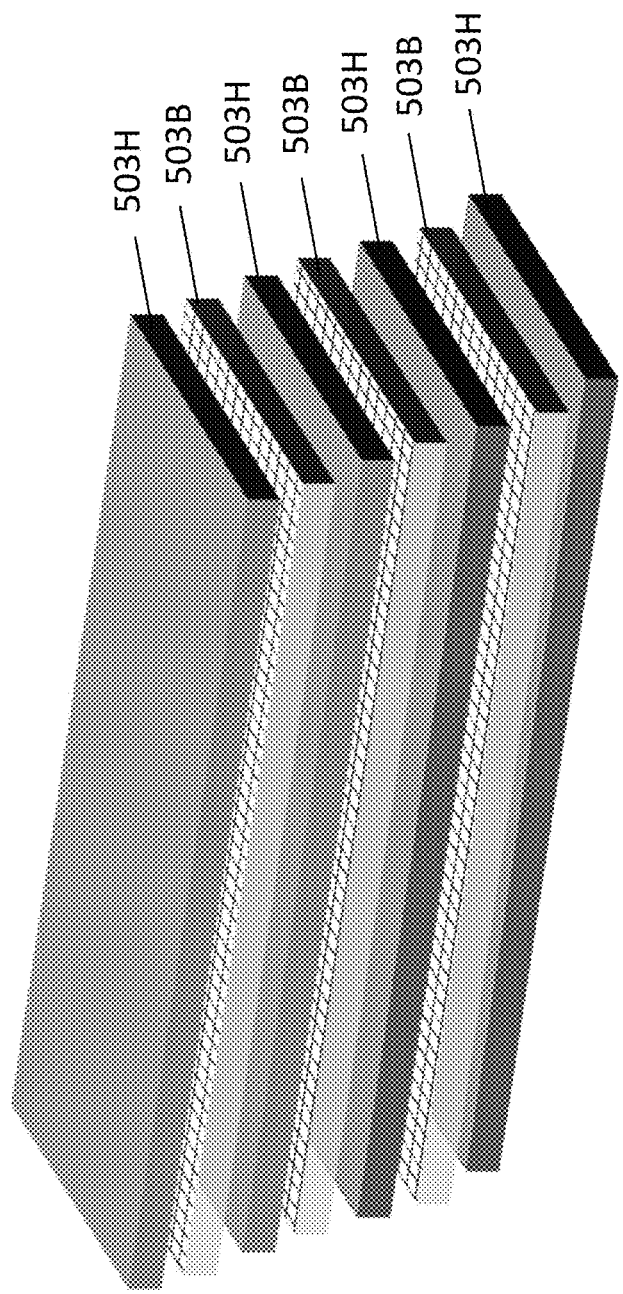
FIG. 5F is a schematic illustration of alternating solid-state additive manufacturing-deposited layers comprising recycled plastic layers and other type of layers, e.g. virgin plastic layer according to an embodiment.

In specific embodiments, VP and WP are used in the solid-state additive manufacturing process as separate feedstocks. For instance, the feedstock in the solid-state additive manufacturing machine are alternating VP material and WP material, resulting in alternating VP layer 503H and WP layer 503B, respectively, as presented in FIG. 5F. In another embodiment, the WP layers alternate with metal interlayers and yet in another embodiment, the WP layers alternate with ceramic or metal interlayers. The thickness of all the involved layers can be the same or different.

In some embodiments, besides the plastics feedstock, a lubricant, a compatibilizer, a plasticizer, a filler and/or any other additive is used in the solid-state additive manufacturing process. The additive helps improve blending and compatibilization of different pieces or different materials or could provide better flow characteristics in case of brittle plastics. In yet another embodiment, since used plastics are usually more brittle than virgin plastics materials, non-conventional low molecular weight compounds, e.g. oligomers, long-chain molecules, elastomers and so on, are used to provide a certain degree of elasticity and/or ductility in the final deposited layer/product.

In another embodiment, reinforcing particles or fibers are added to the solid-state additive manufacturing feedstock of used plastics. Reinforcing particles or fibers can be selected, without limitation, from the following categories: carbon fibers, glass fibers, metal particles, metal fibers, ceramic particles, and high-performance polymer fibers.

Figure 6A:
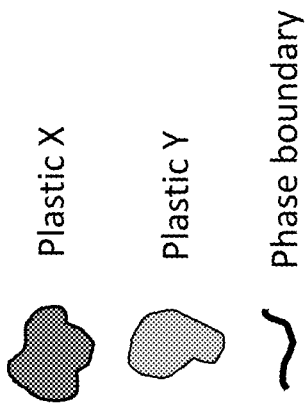
FIG. 6A is a schematic illustration showing phase separation between two plastics X and Y exhibiting phase boundaries between the two phases, which are usually structurally weak zones, according to an embodiment.
Figure 6A:
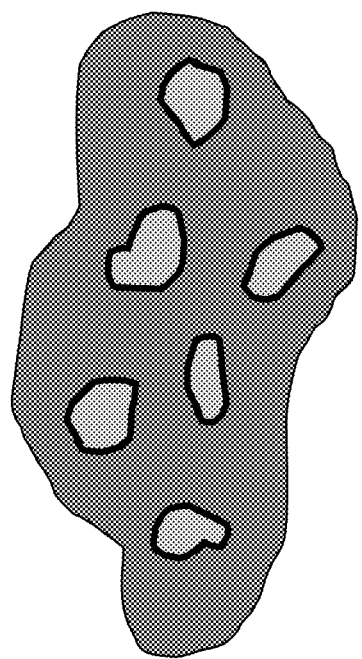

When different types of plastics are mixed and melted together, they tend to phase-separate, like oil and water, i.e. form different phases. The phase boundaries separating different phases in polymeric systems usually cause structural weakness in the resulting material, which can be used in limited applications (FIG. 6A). Examples include two most widely used commodity plastics, polypropylene and polyethylene, or Plastic X and Plastic Y, which phase separate and limit the ability for recycling and processing them together. In order to avoid the issues of phase separation, various chemicals, such as compatibilizers, have been proposed to overcome the difficulties associated with phase separation during recycling.

Figure 6B:
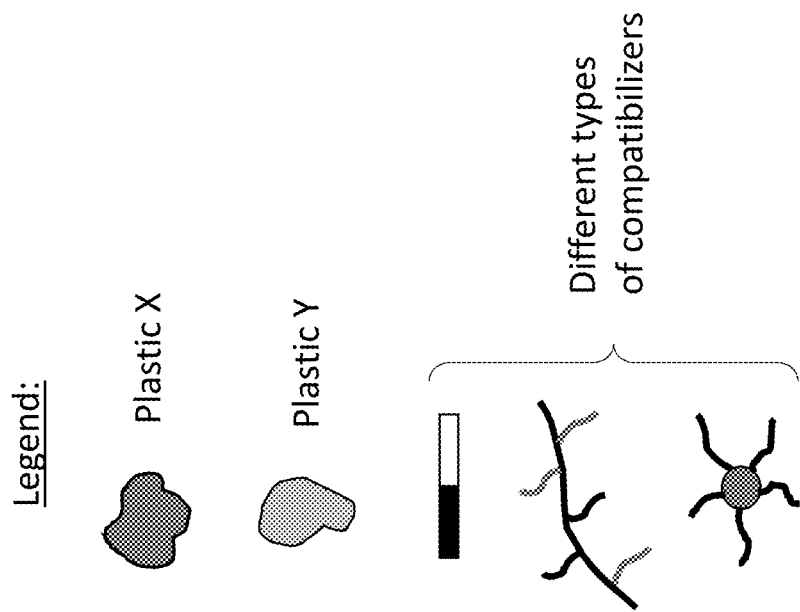
FIG. 6B is a schematic illustration showing no phase boundaries in the polymer system comprising different phases as a result of using a compatibilizer according to an embodiment.
Figure 6B:
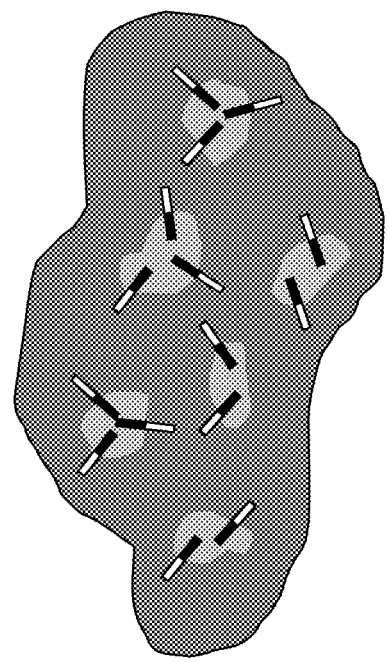

During the solid-state additive manufacturing processes, the materials are not melted, but are in a so-called malleable state below their melting point ($T_m$). The problem of blending two or more different plastic materials that need to be recycled together is solved by adding a compatibilizer (FIG. 6B). Usually, the compatibilizer is a block copolymer, in which one block (part) of the block copolymer is compatible (miscible) with one of the plastic materials in the mixture, while the other block is compatible with the other plastic material. The compatibilizer can also be a graft copolymer or a head-tail molecule or a branched type molecule.

In certain embodiments, the solid-state additive manufacturing processed plastic waste layer is added as a coating to an object or a substrate. In other embodiments, the solid-state additive manufacturing printed waste plastic layer is added as an "inexpensive filler" layer between VP, metallic or ceramic layers.

In some embodiments, the surface of the substrate and/or any of the layers is treated to improve the bonding to the adjacent layer. The treatment might include, but is not limited to, any of the following treatments or any combination of them: laser treatment, plasma treatment, corona treatment, chemical surface functionalization, etching, primer/adhesion promoter use, and ion bombardment.

Figure 7A:
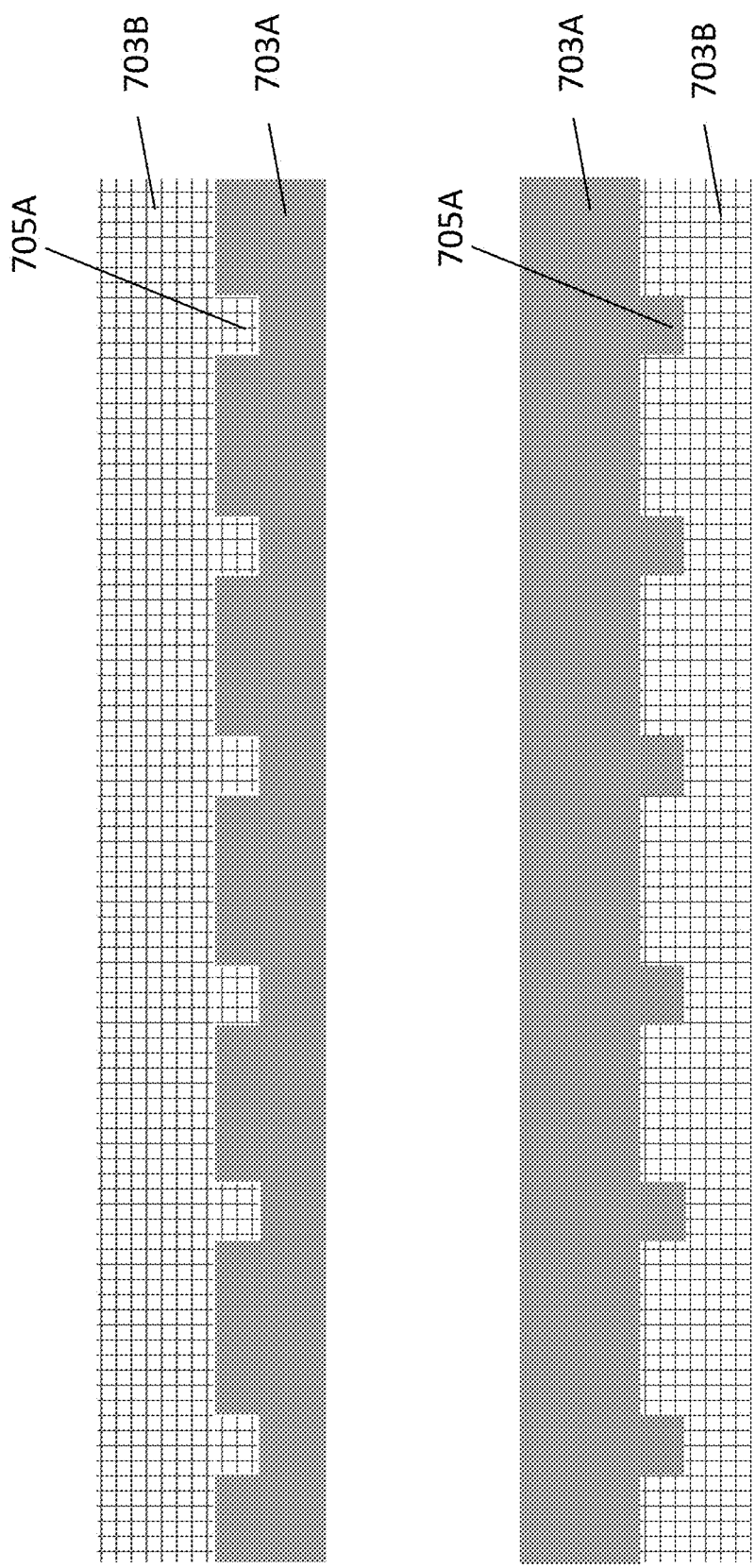
FIG. 7A is a schematic illustration of cross-sections of solid-state additive manufacturing-deposited layers of virgin plastic (VP) and recycled waste plastic (WP) using interlocks according to embodiments.
Figure 7B:
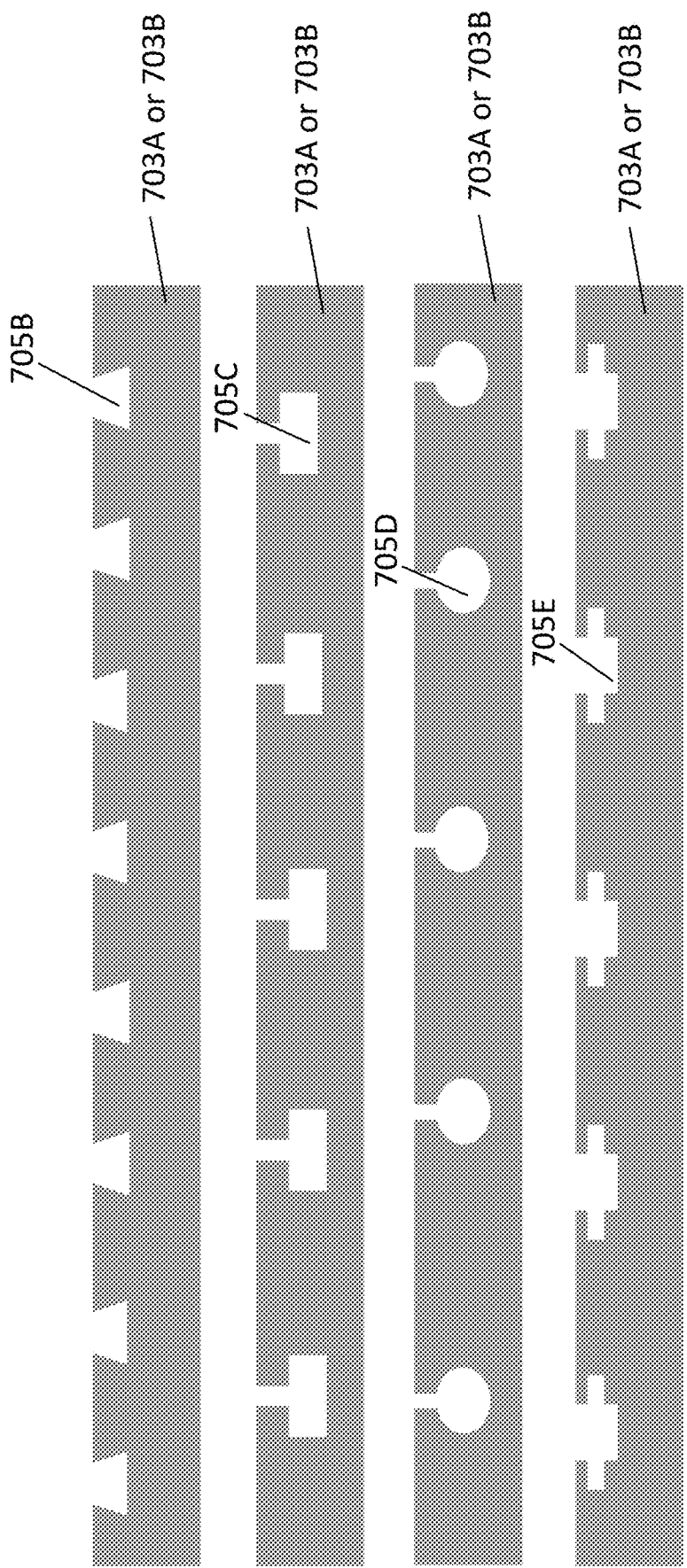
FIG. 7B is a schematic illustration of cross-sections of different interlocks according to embodiments.

In other embodiments, inter-locks 705A are created in one of the layers to improve the bonding between the layers, e.g. in the VP layer 703A that is bonded to the WP layer 703B or vice versa, both deposited by the solid-state additive manufacturing processes (FIG. 7A). Dovetail-type inter-locks 705B and other types of inter-locks 705C, 705D and 705E can also be manufactured (FIG. 7B).

In some embodiments, beside used plastic bottles, the solid-state additive manufacturing machine is capable of accepting and processing cups, caps, lids, straws, food wrappers, flexible packaging, foils, films, shopping bags and others, some of them not recyclable to date due to their low quantities or a chemical nature different than the bulk plastics waste generated.

In certain embodiments, a variety of products are manufactured by solid-state additive manufacturing processes. For instance, plastic pipes, plastic tiles (flooring products), and other products are processed from a plastic waste feedstock or a feedstock which includes a certain fraction of waste plastics. In other examples, plastic blocks are processed from a plastic waste feedstock, which are later shaped into desirable objects and shapes by other processes or operations known in the art.

In another embodiment, the substrate(s) and/or the filler material include metal or metallic materials. The filler material, or the substrate(s) can be independently selected from any metal, including for example Al, Ni, Cr, Cu, Co, Au, Ag, Mg, Cd, Pb, Pt, Ti, Zn, or Fe, Nb, Ta, Mo, W, or an alloy comprising one or more of these metals. In embodiments, the substrate(s) and/or the filler material are polymeric material. Non-limiting examples of polymeric materials useful as a filler material include polyolefins, polyesters, nylons, vinyls, polyvinyls, acrylics, polyacrylics, polycarbonates, polystyrenes, polyurethanes, and the like.

In still yet another embodiment, the filler material is a composite material comprising at least one metallic material and at least one polymeric material. In other embodiments, multiple material combinations can be used for producing a composite at the interface.

In embodiments, the substrate(s) can be provided as a sheet or plate, such as sheet metal or metallic plates or plastic sheets or plates, in a variety of dimensions for joining, including with a width and/or length of from about 1 inch to about 20 feet, such as for example 2'×2', 2'×3', 2'×4', 3'×4', 4'×4, 5'×5, 6'×4', and the like. The size of the sheets is highly dependent on and can fit any desired application. Depths of the substrate(s) as described above can be on the order of micrometers to centimeters.

In these solid-state additive manufacturing embodiments, the filler material (for example, solid bar or powder, and/or polymer) can be fed through the solid-state additive manufacturing system where frictional and adiabatic heating occurs at the filler/substrate interface due to the rotational motion of the filler and the downward force applied. The frictional and adiabatic heating that occurs at the interface results in a severe plastic deformation at the interface of the filler and substrate.

The filler materials can be in several forms, including but not limited to any polymeric form described herein, as well as: 1) metal or plastic powder or rod of a single or composite composition; 2) matrix metal and reinforcement powders which can be mixed and used as feed material; or 3) a solid rod of matrix which can be bored (e.g., to create a tube or other hollow cylinder type structure) and filled with reinforcement powder, or mixtures of metal matric composite and reinforcement material. In the latter, mixing of the matrix and reinforcement can occur further during the fabrication process. In embodiments, the filler material can be a solid metal rod. In one embodiment, the filler material is aluminum.

In embodiments, the filler material is joined with a substrate using frictional heating and compressive loading of the filler material against the substrate and translation of the rotating friction tool. The filler material can be a consumable material, meaning as frictional heating and compressive loading are applied during the process, the filler material is consumed from its original form and is applied to the substrate. Such consumable materials can be in any form including powders, pellets, rods, and powdered-filled cylinders, to name a few. More particularly, as the applied load is increased, the filler material and substrate at the tool-substrate interface become malleable as a result of frictional and adiabatic heating and are caused to bond together under the compressive load.

The rotating tool can take a variety of forms. For example, the tool can be configured as described in any of U.S. Published Application Nos. 2008/0041921, 2010/0285207, 2012/0009339, and 2012/0279441, 2012/0279442, as well as International Patent Application Publication No. WO2013/002869 and International Patent Application Publication No. WO2019/089764, which published applications/publications are incorporated by reference herein in their entireties. Friction-based fabrication tooling for performing methods of the invention are preferably designed or configured to allow for a filler material to be fed through or otherwise disposed through an internal portion of a non-consumable member, which can be referred to as a throat, neck, center, interior, or through hole disposed through opposing ends of the tool. This region of the tool can be configured with a non-circular through-hole shape. Various interior geometries for the tooling are possible. With a non-circular geometry, the filler material is compelled or caused to rotate at the same angular velocity as the non-consumable portion of the tool due to normal forces being exerted by the tool at the surface of the tool throat against the feedstock. Such geometries can include a square through-hole and an elliptical through-hole as examples. In configurations where only tangential forces can be expected to be exerted on the surface of the filler material by the internal surface of the throat of the tool, the feed stock will not be caused to rotate at the same angular velocity as the tool. Such an embodiment can include a circular geometry for the cross-section of the tool in combination with detached or loosely attached feedstock, which would be expected to result in the filler material and tool rotating at different velocities. As used in this disclosure, the terms "additive friction-stir tool", "friction-stir tool", "non-consumable friction-stir tool", "rotating non-consumable friction-stir tool" can be used interchangeably.

In embodiments the throat of the tool can be shaped with a non-circular cross-sectional shape. Further desired are tooling wherein the throat of the tool is shaped to exert normal forces on a solid, powder, or powder-filled tube type filler material disposed therein. Embodiments can also include features to ensure the frictional heating and compressive loading are of a degree sufficient to enable mixing of dispensed filler material with material of the substrate at a filler-substrate interface.

More specifically, the magnitude of force transferred from the rotating tool to the filler material is dependent on the coefficient of friction between the two. Thus, if the coefficient of friction is significantly low and the inertial force required to induce rotation of the filler material is significantly high, then the tool can rotate without inducing rotation (or with inducing rotation at a lower speed than the tool) in the cylindrical filler material. Under some circumstances during operation, differences in rotational velocity between the tool and the filler within the tool can lead to some filler material being deposited inside the tool, an accumulation of which can be problematic. Having the specific interior tool geometries can reduce this issue, such as appropriately sized square-square or elliptical-elliptical shaped filler-dispenser geometries. Another way of reducing the difference in rotational velocity between the tool and the filler material is to manufacture filler material rods to fit tightly within the throat of the tool, or to otherwise tightly pack the filler material into the throat of the tool.

Any shape of the cross section of the interior of the tool that is capable of exerting normal forces on a filler material within the tool can be used. The throat surface geometry and the filler material geometry can be configured to provide for engagement and disengagement of the tool and filler material, interlocking of the tool and feed material, attachment of the tool and feed material, whether temporary or permanent, or any configuration that allows for the filler material to dependently rotate with the tool.

The interior surface shape of the tool (the throat) and the corresponding shape of the filler material can be constructed in a manner suitable for a particular application. Shapes of these surfaces can include, but are by no means limited to, square, rectangular, elliptical, oval, triangular, or typically any non-circular polygon. Additional shapes can include more distinctive shapes such as a star, daisy, key and keyhole, diamond, to name a few. Indeed, the shape of the outside surface of the filler material need not be the same type of shape as the surface of the throat of the tool. For example, there can be advantages from having a filler material rod with a square cross-section for insertion into a tool throat having a rectangular cross-section, or vice-versa where a filler material rod having a rectangular cross-section could be placed within a tool throat having a square cross-section in which the corners of the filler material rod could contact the sides of the square throat instead of sides contacting sides. Particular applications can call for more or less forces to be exerted on the filler material within the throat during operation of the tool. With concentric shapes and very close tolerance between the filler material and the tool certain advantages can be realized. Additionally, different shapes can be more suitable for different applications or can be highly desired due to their ease of manufacturing both the interior of the tool and corresponding filler material rods. One of ordinary skill in the art, with the benefit of this disclosure, would know the appropriate shapes to use for a particular application.

Additional embodiments of additive friction stir tools can include a tool with a throat, where the filler material and throat are operably configured to provide for continuous feeding of the filler material through the throat of the stirring tool. In embodiments, the filler material is a powder, the throat of the tool is a hollow cylinder, and an auger shaped member disposed within the throat of the tool is used to force powder material through the throat of the tool onto the substrate. The filler material can be delivered by pulling or pushing the filler material through the throat of the stirring tool.

Additional embodiments can comprise a tool or additive friction stir tool comprising: a non-consumable body formed from material capable of resisting deformation when subject to frictional heating and compressive loading; a throat with an internal shape defining a passageway lengthwise through the non-consumable body; an auger disposed within the tool throat with means for rotating the auger at a different velocity than the tool and for pushing powdered filler material through the tool throat; whereby the non-consumable body is operably configured for imposing frictional and adiabatic heating and compressive loading of the filler material against a substrate resulting in plasticizing of the filler material and substrate.

In embodiments, the tool and auger rotate relative to the substrate. In further embodiments, the tool and auger rotate relative to one another, i.e., there is a difference in rotational velocity between the auger and the tool body. There can be some relative rotation between the filler material and the substrate, tool, or auger. The filler material and tool are not attached to one another to allow for continuous or semi-continuous feeding or deposition of the filler material through the throat of the tool.

For example, the filler material to be joined with the substrate can be applied to the substrate surface using a "push" method, where a rotating-plunging tool, e.g., auger, pushes the filler material through the rotating tool, such as a spindle. Feed material can be introduced to the tool in various ways, including by providing an infinite amount of filler material into the tool body from a refillable container in operable communication with the tool.

In embodiments, the filler material is a powdered solid and is fed through the tool body using an auger shaped plunging tool (e.g., a threaded member). In such an embodiment, the plunging tool can be designed to move or "plunge" in a direction toward the substrate. For example, the threaded configuration of the auger itself is capable of providing sufficient force on the powdered feed material to direct the filler material toward the substrate for deposition, without needing vertical movement of the auger relative to the tool.

As the spindle and plunging tool rotate, compressive loading and frictional heating of the filler material can be performed by pressing the filler material into the substrate surface with the downward force (force toward substrate) and rotating speed of the additive friction stir tool.

During the joining process, the spindle can rotate at a slightly slower rate than the auger. Alternatively, in embodiments, the spindle can also be caused to rotate faster than the auger. What is important in embodiments is that there is relative rotation between the spindle and the auger during application of the filler material. Due to the difference in rotational velocities, the threaded portion of the auger provides means for pushing the filler material through the tool body to force the material out of the tool toward the substrate. The threads impart a force on the feedstock that pushes the feed material toward the substrate much like a linear actuator or pneumatic cylinder or other mechanical force pushing on a surface of the feedstock. Even further, it can be desired in some applications to alter the rotational velocity of the tool body and/or auger during deposition of the filler material.

The deposition rate of the filler material on the substrate can be adjusted by varying parameters such as the difference in rotational velocity between the auger screw and the spindle, or by modifying the pitch of the threads on the auger. If desired, for particular applications it can be warranted to control filler material temperature inside or outside of the tool body with for example an external heat source. Such thermally induced softening of the filler material can increase the rate of application of the material.

In the context of this specification, the terms "filler material," "consumable material," "consumable filler material", "feed material," "feedstock" and the like can be used interchangeably to refer to the material that is applied to the substrate from the additive friction stir/solid-state additive manufacturing tooling. In an embodiment, a powder filler material is used in combination with an auger disposed in the tool throat for applying a constant displacement to the filler material within the throat.

The filler material (for example, powder or solid feedstock) can be fed through the rotating spindle to exit the tool where frictional heating occurs at the filler/substrate interface due to the rotational motion of the filler and the downward force applied. The frictional and adiabatic heating that occurs at the interface acts to plastically deform the substrate and filler material at the interface resulting in a metallurgical bond or other bond between the substrate and filler.

A mechanism can be used to feed powder into the spindle and force the powder out of the spindle while ensuring the filler is keyed into the spindle. This system utilizes an auger screw to force powder through the spindle at a defined rate, which is one means capable of accomplishing this purpose. Additional methods of feeding solid stock keyed into the orientation of the spindle and rotating at the exact rate of the spindle are conceivable. For example, force can be applied to the filler material using a metal rolling mill type mechanism which is rotating with the spindle.

In such an embodiment, the spindle is spinning at a desired rotational velocity and the auger screw is driven at a different rotational speed in the same rotational direction which acts to force material out of the spindle. The angular rotational speed or velocity of the friction stir tool is identified as $\omega 1$ and the angular rotational velocity of the auger is identified as ω2. In the context of this specification, the terms "rotational speed," "rotational velocity," "angular speed," and "angular velocity" can be used interchangeably and refer to the angular velocity of a component of the tool during use. The auger screw can rotate at a slower speed than the spindle, or the auger screw can rotate faster than the spindle. What is important is that there is relative rotation between the spindle and auger to cause filler material to be forced through the throat of the tool.

The pitch of the threaded auger screw and the volumetric pitch rate of the screw will affect the deposition rate under certain circumstances and can be modified to accomplish particular goals. It is within the skill of the art to modify the pitch of the threads on the auger to obtain a certain desired result. The terms "tool," "friction stir tool," "spindle," "tool body," and the like as used in this specification can be used to refer to the outer portion of the tool body, which comprises a passageway lengthwise through the tool for holding and dispensing feed material through the tool. This passageway, or throat, is generally the shape of a hollow cylinder. The hollow cylinder can be configured to have a wider opening at the top of the tool for accommodating the auger and powder material and a smaller opening at the base of the tool where the feed material is dispensed from the tool. Thus, the shape of the throat of the tool need not be consistent throughout the length of the tool throat and can be configured to converge from one lengthwise end of the tool to the other. The throat of the tool can comprise a first region which is the shape of a hollow cylinder of a first diameter. This region can transition into a second region which is the shape of a hollow cylinder of a second smaller diameter. The transition region can be a converging hollow cylinder or funnel shaped region to allow the first and second region to be connected seamlessly.

Disposed within the tool body is an auger. In the context of this specification, the terms "auger," "screw," and "plunger" can be used to refer to a component of the tool that is disposed within the tool throat for pushing or pulling material through the throat. In embodiments, the auger can be considered a component of the friction stir tool body. The auger can have the general shape of a screw with threads or can be shaped in a spiral configuration similar to a spring. When disposed within the tool throat, there can be clearance between the auger and the inside surface of the tool throat to allow for the passage of feed material between the auger and the throat. The inside of the surface of the tool throat includes a sleeve and a bore. In other embodiments, there is only enough space to allow for rotation of the auger without interference from the surface of the throat. Preferably, the auger and tool body or spindle are not attached to one another. Each is operably connected with means for rotating and translating the components relative to a substrate surface, such that the auger and tool can rotate at different speeds but translate relative to the substrate at the same speed. The auger can be disposed within the tool throat in a manner such that there is no relative translational movement between the auger and tool body.

Powdered materials can be fed into the top of the spindle using a fluidized powder delivery system. Any type of powder delivery system can be used in connection with the tools and systems described herein. For example, a gravity-fed powder feeder system can be used, such as a hopper. One such feed system is the Palmer P-Series Volumetric Powder Feeder from Palmer Manufacturing of Springfield, Ohio, which is capable of delivering feed material from 0.1-140 cu. ft. per hour, and which comprises a flexible polyurethane hopper, stainless steel massaging paddles, 304 stainless steel feed tube and auger, 90-volt DC gearhead drive motor, flexible roller chain drive system, sealed drive train and cabinet, and solid state control and pushbutton controls. The feed system preferably comprises a reservoir for holding powder filler material, a mixer for mixing powder(s) added to the reservoir, and a passageway for delivering feed material from the hopper to the throat of the tool body. As feed material is dispensed into and from the tool, more feed material is delivered into the tool from the hopper. In this manner, the feed material is continuously or semi-continuously delivered. The gravity-fed dispensing systems allow for feed material to automatically be dispensed from the hopper to the friction stir tool during use as soon as material within the tool is dispensed.

In embodiments, a mix of powder types can be added to the hopper which is operably connected with the stir tool. Alternatively, several different types of powder can be added individually to the hopper, then mixed within the hopper and dispensed as a mixture to the friction stir tool during use. For example, a metal powder and ceramic powder could be fed into the spindle at the same time, from the same or separate hoppers, and upon consolidation/deposition the filler would be a metal matrix composite (MMC). As used herein, the term "metal matrix composite" means a material having a continuous metallic phase having another discontinuous phase dispersed therein. The metal matrix can comprise a pure metal, metal alloy or intermetallic. The discontinuous phase can comprise a ceramic such as a carbide, boride, nitride and/or oxide. Some examples of discontinuous ceramic phases include SiC, $TiB_2$ and $Al_2O_3$. The discontinuous phase can also comprise an intermetallic such as various types of aluminides and the like. Titanium aluminides such as TiAl and nickel aluminides such as $Ni_3Al$ can be provided as the discontinuous phase. The metal matrix can typically comprise Al, Cu, Ni, Mg, Ti, Fe and the like. Similarly, a metal powder and plastic powder, or ceramic powder and plastic powder, can be fed simultaneously, at different times, from the same hopper, or from separate hoppers.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

What is claimed is:

1. A method comprising:
forming a conductive polymer or plastic composition with at least one conductive solid filler and at least one polymer or plastic using solid-state additive manufacturing; and
forming a conductive 3D object by depositing the conductive polymer or plastic composition as a conductive coating or layer in a multi-component part comprising a substrate, wherein the depositing comprises
feeding the at least one conductive solid filler and the at least one polymer or plastic through a hollow spindle or tool of a solid-state additive manufacturing machine, wherein the hollow spindle or tool comprises a shoulder; and
generating plastic deformation of the at least one conductive solid filler and the at least one polymer or plastic by applying normal, shear and/or frictional forces by way of rotating of the shoulder of the hollow spindle or tool such that the at least one conductive solid filler and/or the at least one polymer or plastic are in a malleable and/or visco-elastic state in an interface region between the substrate and the hollow spindle or tool to deposit the at least one conductive solid filler and the at least one polymer or plastic on the substrate, thereby producing the formed conductive 3D object.

2. The method of claim 1, wherein the depositing is performed while monitoring conductive solid filler temperature during the depositing on the substrate.

3. The method of claim 1, wherein the conductive polymer or plastic composition is a thermally conductive but electrically insulating composition.

4. The method of claim 1, wherein the conductive polymer or plastic composition is an electrically conductive but thermally insulating composition.

5. The method of claim 1, wherein the conductive polymer or plastic composition is a thermally- and electrically-conductive composition.

6. The method of claim 1, wherein the conductive polymer or plastic composition is deposited on a non-conductive substrate or object.

7. The method of claim 1, wherein the conductive polymer or plastic composition is deposited on a conductive substrate or object.

8. The method of claim 1, wherein the conductive polymer or plastic composition is deposited to form an anti-static (AS) coating.

9. The method of claim 1, wherein the conductive polymer or plastic composition is deposited to form an electrostatic discharge (ESD) coating.

10. The method of claim 1, wherein the conductive polymer or plastic composition is deposited to form an electromagnetic interference (EMI) shielding coating.

11. The method of claim 1, wherein the conductivity of the plastic composition is higher than $100^2$ S/cm.

12. The method of claim 1, wherein the conductivity of the plastic composition is higher than 1 S/cm.

13. The method of claim 1, wherein the conductive polymer or plastic composition is deposited to form the 3D conductive object to distribute heat evenly throughout the formed 3D conductive object.

14. The method of claim 1, wherein the thermal conductivity of the plastic composition is higher than 1 (W/(m–K)).

15. The method of claim 1, wherein the thermal conductivity of the plastic composition is higher than 10 (W/(m–K)).

16. The method of claim 1, wherein the conductive polymer or plastic composition comprises micron-size conductive fillers.

17. The method of claim 1, wherein the conductive polymer or plastic composition comprises nano-size conductive fillers.

18. The method of claim 1, wherein the conductive polymer or plastic composition and/or conductive filler comprises carbon nanotubes (CNT).

19. The method of claim 1, wherein the conductive polymer or plastic composition and/or conductive solid filler comprises carbon black.

20. The method of claim 1, wherein the conductive polymer or plastic composition and/or conductive filler comprises graphite.

* * * * *